US010475066B1

(12) United States Patent
Kakani et al.

(10) Patent No.: US 10,475,066 B1
(45) Date of Patent: *Nov. 12, 2019

(54) TARGETED ONLINE MULTIMEDIA ADVERTISING

(71) Applicant: VDOPIA INC., Fremont, CA (US)

(72) Inventors: Srikanth Kakani, Fremont, CA (US); Saurabh Bhatia, Fremont, CA (US); Lloyd Lim, Fremont, CA (US)

(73) Assignee: VDOPIA INC., Fremont, CA (US)

( * ) Notice: Subject to any disclaimer, the term of this patent is extended or adjusted under 35 U.S.C. 154(b) by 552 days.

This patent is subject to a terminal disclaimer.

(21) Appl. No.: 14/752,715

(22) Filed: Jun. 26, 2015

Related U.S. Application Data

(63) Continuation-in-part of application No. 14/491,925, filed on Sep. 19, 2014, now Pat. No. 9,990,650.

(60) Provisional application No. 62/018,442, filed on Jun. 27, 2014, provisional application No. 61/880,740, filed on Sep. 20, 2013.

(51) Int. Cl.
  *G06Q 30/02* (2012.01)
(52) U.S. Cl.
  CPC ..... *G06Q 30/0245* (2013.01); *G06Q 30/0269* (2013.01); *G06Q 30/0275* (2013.01)
(58) Field of Classification Search
  CPC ........... G06Q 30/0245; G06Q 30/0275; G06Q 30/0269
  USPC ...................................... 705/14.44
  See application file for complete search history.

(56) References Cited

U.S. PATENT DOCUMENTS

| 8,239,889 | B2* | 8/2012 | Wong ..................... G06Q 30/02 |
| | | | 725/11 |
| 8,468,056 | B1* | 6/2013 | Chalawsky ........ H04N 21/2547 |
| | | | 705/14.41 |
| 8,893,012 | B1* | 11/2014 | Zhang ................ G06Q 30/0245 |
| | | | 705/14.41 |

(Continued)

OTHER PUBLICATIONS

"Nonlinear, clickable multimedia content for an interactive video experience" Authored by: Christian Rack, Robert Seeliger, Dr. Stefan Arbanowski (IEEE Publication Year: 2010).*

(Continued)

*Primary Examiner* — Victoria E Frunzi

(74) *Attorney, Agent, or Firm* — Morgan, Lewis & Bockius LLP

(57) ABSTRACT

A server system accesses a branding profile that includes one or more demographics associated with the user. The system selects an advertising campaign in accordance with the one or more demographics. The advertising campaign includes a pool of multimedia advertisements and a pool of questions, and is associated with a subset of the one or more demographics. The system selects a multimedia advertisement from the pool of multimedia advertisements and a question from the pool of questions. The question is associated with a plurality of predefined answers to the question. The system transmits, to a client, instructions that cause: the multimedia advertisement to be presented by the client device; the question to be presented by the client device concurrently with the multimedia advertisement; and an affordance to be provided corresponding to each of the predefined answers to the question. The system receives a response and updates the branding profile accordingly.

20 Claims, 26 Drawing Sheets

(56) References Cited

U.S. PATENT DOCUMENTS

| | | | |
|---|---|---|---|
| 2009/0100331 A1* | 4/2009 | Sauve | G06Q 30/02 |
| | | | 715/235 |
| 2009/0292608 A1* | 11/2009 | Polachek | G06Q 30/02 |
| | | | 705/14.44 |
| 2011/0055003 A1* | 3/2011 | Wang | G06Q 30/02 |
| | | | 705/14.45 |
| 2011/0082824 A1* | 4/2011 | Allison | G06N 99/005 |
| | | | 706/20 |
| 2012/0110618 A1* | 5/2012 | Kilar | G06Q 30/02 |
| | | | 725/34 |
| 2013/0046613 A1* | 2/2013 | Farahat | G06Q 30/00 |
| | | | 705/14.43 |
| 2014/0278920 A1* | 9/2014 | Holden | G06Q 30/0245 |
| | | | 705/14.44 |

OTHER PUBLICATIONS

Kakani, Final Office Action, U.S. Appl. No. 14/491,925, dated Apr. 17, 2015, 47 pgs.

Kakani, Office Action, U.S. Appl. No. 14/491,925, dated Dec. 15, 2014, 38 pgs.

Christian Rack et al., "Nonlinear, clickable multimedia content for an interactive video experience," 2010 Second International Conference on Advances in Multimedia, IEEE Computer Society, 5 pgs.

Kakani, Notice of Allowance, U.S. Appl. No. 14/491,925, dated Feb 2, 2018, 9 pgs.

\* cited by examiner

TARGETED ONLINE MULTIMEDIA ADVERTISING

RELATED APPLICATIONS

This application claims priority to U.S. Provisional Application 62/018,442, entitled "Targeted Online Multimedia Advertising," filed Jun. 27, 2014, and is a continuation in part of U.S. application Ser. No. 14/491,925, entitled "Online Multimedia Advertising," filed Sep. 19, 2014, which in turn claims priority to U.S. Provisional Application 61/880,740, entitled "Online Multimedia Advertising," filed Sep. 20, 2013, all of which are hereby incorporated by reference in their entirety.

TECHNICAL FIELD

The technology generally relates to server systems and methods for targeted advertising, and client devices on which advertisements are displayed.

BACKGROUND

Online marketing, for example, through mobile advertising, has become a popular way for advertisers to reach consumers that may be interested in the products and services offered by those advertisers. Like other advertising media, online advertising frequently involves both publishers who integrate advertisements into their online content, and advertiser who provide such advertisements. These publishers can include, for example, website providers (e.g., news outlets) and streaming media services. Often, publishers provide content as a free service (e.g., a news service or a music service) and rely on hosting of advertisements in order to remain profitable.

One problem with conventional methods of online advertising is that such advertisements do not provide useful feedback to the advertisers that can be used to further develop their products and services. Nor do conventional methods of online advertising provide useful feedback to the advertisers that can be used to further develop their advertisements, or further target such advertisements to users who are likely to be interested in their products and services. For example, conventional methods of tracking such advertisements rely on metrics such as cost per action or cost per click, which at best indicate that the user somehow acknowledged the advertisement rather than indicating that the user has a positive or negative opinion of the advertised content.

Another problem with conventional methods of online advertising is that such advertisements do not provide a convenient way of engaging the user. Such advertisements can be disruptive to the user's activity (e.g., by forcing the user to watch all or at least part of a video advertisement before the user can continue their desired activity on the device). These types of disruptive advertisements can lead to annoyance and resentment on the part of the user toward publishers and advertiser. Alternatively, such advertisements can be more passive (e.g., a banner advertisement at the top of a webpage). Unfortunately, such passive advertisements are easy for the user to ignore and avoid interacting with. Moreover, in neither of these cases (i.e., disruptive or passive advertising) does the user feel that he or she has a personal stake in the advertisement.

SUMMARY

There is a need for methods of online advertising that are engaging and convenient for users, as well as informative and effective for advertisers.

To this end, in accordance with some implementations, a method is performed at a server system having one or more processors. The method includes accessing a branding profile corresponding to a client device. The branding profile includes one or more demographics associated with a user of the client device. The one or more demographics are selected from a plurality of predefined demographics. The server system selects an advertising campaign in accordance with the one or more demographics. The advertising campaign includes a pool of multimedia advertisements and a pool of questions. The advertising campaign is also associated with a subset of the one or more demographics.

The server system selects, from the advertising campaign, a multimedia advertisement from the pool of multimedia advertisements and a question from the pool of questions. The question is associated with a plurality of predefined answers to the question. The server system transmits, to the client device: instructions that cause the multimedia advertisement to be presented by the client device; instructions that cause the question to be presented by the client device concurrently with the multimedia advertisement; and instructions for providing a respective affordance on the client device corresponding to each of the predefined answers to the question. The server system receives, from the client device, a response corresponding to one of the predefined answers to the question and updates, based on the response to the question, the branding profile corresponding to the client device.

In some embodiments, the server system updates, based on the response to the question, demographics with which the advertising campaign is associated.

In some embodiments, the advertising campaign is associated with an advertiser.

In some embodiments, the advertising campaign is a respective advertising campaign of a plurality of advertising campaigns, each advertising campaign of the plurality of advertising campaigns including a respective pool of multimedia advertisements and a respective pool of questions. In some embodiments, selecting an advertising campaign includes: determining one or more of the plurality of advertising campaigns that meet predefined criteria with respect to the one or more demographics; ranking the one or more advertising campaigns at least partially based on compatibility between the individual advertising campaigns and the one or more demographics; and selecting the respective advertising campaign based on the ranking of the one or more advertising campaigns. In some embodiments, the ranking of the one or more advertising campaigns is based at least in part on data mining of historical responses of users associated with the one or more demographics to questions included in the plurality of advertising campaigns. In some embodiments, the ranking of the one or more advertising campaigns is based at least in part on monetary bids associated with the one or more advertising campaigns.

In some embodiments, accessing the branding profile includes using at least one of a plurality of identifiers corresponding to the client device, the plurality of identifiers including a device issued identifier, a cookie identifier, and a device fingerprint identifier.

In some embodiments, the plurality of predefined answers to the question includes a predefined answer corresponding to approval of a respective subject associated with the multimedia advertisement and a predefined answer corresponding to disapproval of the respective subject. In some circumstances, the subject is one of the group consisting of: a product associated with the multimedia advertisement, content of the multimedia advertisement, a brand associated with the multimedia advertisement, and a product category to which a product associated with the multimedia advertisement belongs. In some embodiments the predefined answer corresponding to approval signifies intent to engage in a transaction associated with the respective subject and the predefined answer to corresponding to disapproval signifies intent to forgo engaging in a transaction associated with the respective subject. In some embodiments, when the received response to the multimedia advertisement is the predefined answer corresponding to approval of the respective subject, the branding profile is updated such that a second multimedia advertisement is selected that has a greater degree of similarity to the respective subject than when the received response to the multimedia advertisement is the predefined answer corresponding to disapproval of the respective subject.

In some embodiments, the server system determines, based on responses received to a plurality of questions, one or more demographics to which the user of the client device belongs and updates the branding profile to include the one or more determined demographics.

In another aspect of the present invention, to address the aforementioned limitations of conventional online advertising, some implementations provide a non-transitory computer readable storage medium storing one or more programs. The one or more programs comprise instructions, which when executed by a server system with one or more processors and memory, cause the server system to perform any of the methods provided herein.

In yet another aspect of the present invention, to address the aforementioned limitations of online advertising, some implementations provide a server system. The server system includes one or more processors, memory, and one or more programs. The one or more programs are stored in memory and configured to be executed by the one or more processors. The one or more programs include an operating system and instructions that when executed by the one or more processors cause the server system to perform any of the methods provided herein.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

DESCRIPTION OF IMPLEMENTATIONS

The implementations described herein improve on conventional methods of online advertising by allowing a user of a client device (e.g., a user to whom a multimedia advertisement is served) to vote on a question as a manner of closing a multimedia advertisement. For example, in some circumstances, a user may request, on a client device, to view a video streamed by a publisher (e.g., within a mobile web browser or within the publisher's mobile application). In such circumstances, the publisher will serve an advertisement, such as a video advertisement for an upcoming movie release (e.g., a trailer), prior to allowing the user to view the requested video. According to some implementations provided herein, the user will be able to vote to close the video advertisement—sooner than the advertisement would otherwise close—by answering a question (such as "Would you like to see this movie?") provided with, or for display with, the trailer.

In accordance with some implementations, voting to close a multimedia advertisement provides several advantages over conventional methods of online advertising. First, the advertiser receives feedback that can be used to further develop their products and services. The advertisers can also use such feedback to further develop their advertisements, or further target such advertisements to users who are likely to be interested in their products and services. Secondly, the vote to close method of closing a multimedia advertisement provides users (e.g., to whom the advertisements are directed) with a social media element to viewing the advertisement, which makes receiving such advertisements more appealing and engaging to the users. For example, according to some implementations, after a user votes on the question "Would you like to see this movie?" the user is shown an aggregated summary of other user's votes (e.g., a percentage of people who voted "Yes" and a percentage of people who voted "No"). This provides a reward for voting that is more convenient (e.g., it does not result in a significant delay in the user being able to return to their desired content) and is more enticing for the modern user than, for example, an abstract, low-probability chance to win something.

To this end, various methods, servers, and client devices for vote to close online advertising are described below with reference to the figures.

Figure 1:
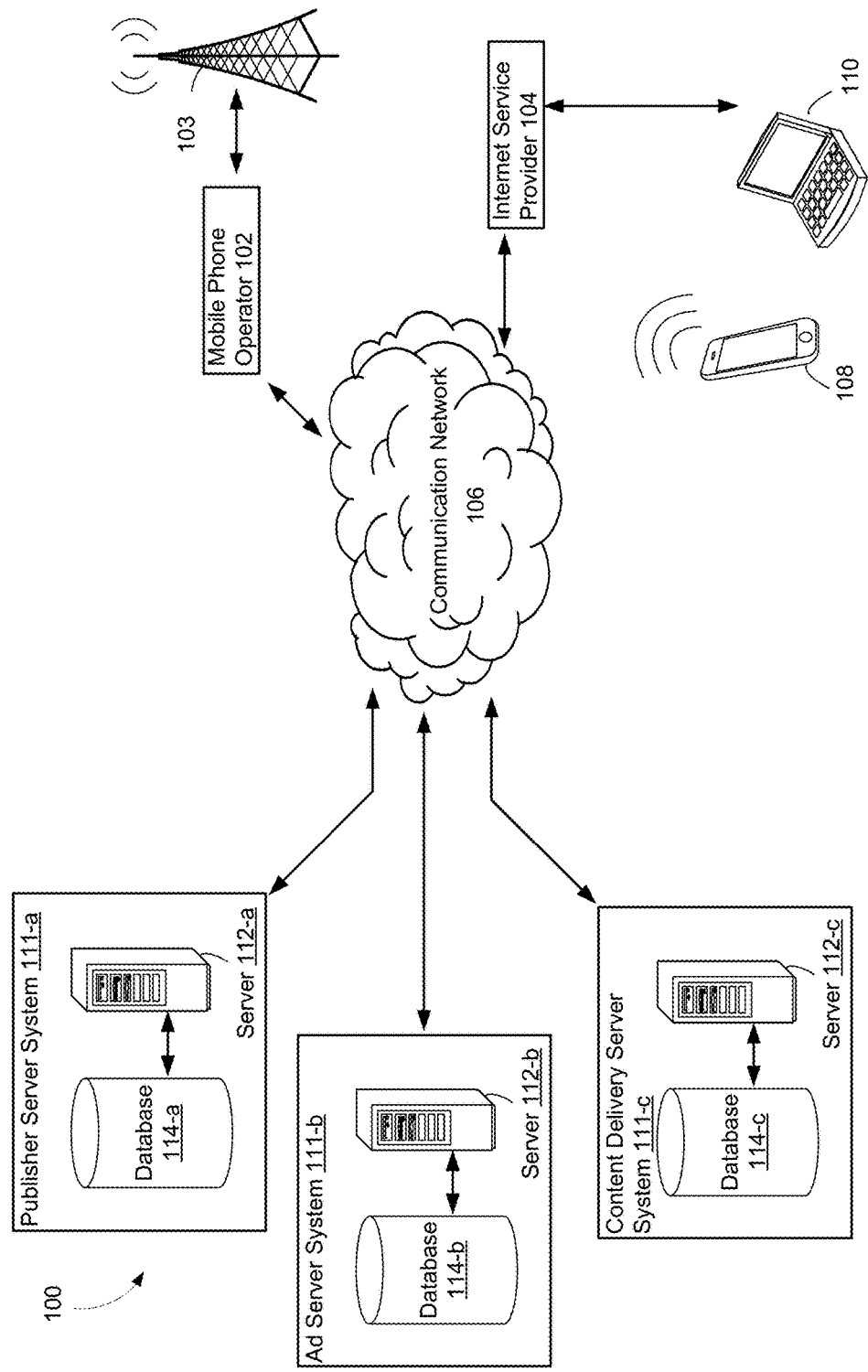
FIG. 1 is a diagram of a client-server environment, in accordance with some implementations.

FIG. 1 is a diagram of a client-server environment 100, in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 100 includes one or more mobile phone operators 102, one or more Internet service providers 104, and a communications network 106.

The mobile phone operator 102 (i.e., wireless carrier), and the Internet service provider 104 are capable of being connected to the communication network 106 in order to exchange information with one another and/or other devices and systems. Additionally, the mobile phone operator 102 and the Internet service provider 104 are operable to connect client devices to the communication network 106 as well. For example, a smart phone 108 is operable with the network of the mobile phone operator 102, which includes for example, a base station 103. Similarly, for example, a personal computer 110 (e.g., a laptop computer, tablet, desktop, smart television, workstation or the like) is connectable to the network provided by an Internet service provider 104, which is ultimately connectable to the communication network 106.

The communication network 106 may be any combination of wired and wireless local area network (LAN) and/or wide area network (WAN), such as an intranet, an extranet, including a portion of the Internet. It is sufficient that the communication network 106 provides communication capability between client devices (e.g., smart phones 108 and personal computers 110) and servers. In some implementations, the communication network 106 uses the HyperText Transport Protocol (HTTP) to transport information using the Transmission Control Protocol/Internet Protocol (TCP/IP). HTTP permits a client device to access various resources available via the communication network 106. However, the various implementations described herein are not limited to the use of any particular protocol.

In some implementations, the client-server environment 100 further includes:

- A publisher server system 111-*a*. Within the publisher server system 111-*a*, there is a server computer 112-*a* (e.g., a network server such as a web server) for receiving and processing data received from the client device 108/110. In some implementations, the publisher server system stores (e.g., in a database 114-*a*) and maintains a plurality of web pages and provides the web pages to the client devices 108/110 upon receipt of an access request. In some implementations, the publisher provides content to a mobile application (sometimes referred to as an "app") running on the client device 108/110, such as a gaming app, or a streaming music and video app. In some circumstances, the publisher server system 111-*a* provides content to a respective client device 108/110 (whether it be a web page or content for a mobile app, or other content) that contains script (e.g., code) indicating that an advertisement (sometimes referred to as an "ad") is to be served when the web page is loaded by the client device 108/110. The client device 108/110 receives the script indicating that an ad is to be served, and transmits an ad request to an ad server system 111-*b*, as described below.
- One or more ad server systems 111-*b*. Within the ad server system 111-*b*, there is a server computer 112-*b* for receiving and processing ad requests from a client device 108/110 and a database 114-*b* storing one or more advertisements and metadata (such as user and demographic metadata). In some implementations, the ad server system 111-*b* responds to the ad request by providing an advertisement script to the client device 108/110 (e.g., as a JavaScript object such as a JSON string, herein referred to as the "ad"). In some implementations, the ad includes a multimedia object such as an audio file, a video file, other media formats, and/or combinations thereof. In some implementations, rather than serving the multimedia object directly, the ad includes instructions for retrieving the multimedia object from a content distribution server. In some implementations, the ad includes a question that accompanies the multimedia object (e.g., "Do you plan to see this movie?"), one or more potential user responses to the question (e.g., "Yes," and "No"), instructions for obtaining, from the client device 108/110, a user response to the question (e.g., a respective one of the potential user responses that is selected by a user of the client device 108/110), and instructions for formatting the multimedia object (including the question) on an application of the client device 108/110 (e.g., a web browser or a mobile application).
- One or more content delivery server systems 111-*c*. Within the content delivery server systems 111-*c*, there is a server computer 112-*c* and a database 114-*c* for receiving and processing requests for objects. In some implementations, the ad is transmitted from the ad server system 111-*b* and/or the client device 108/110 and the ad's instructions include a URL that is parsed by a DNS server and further routed to a respective content delivery server 112-*b* that is best able to serve the multimedia object.

Those skilled in the art will appreciate from the present disclosure that any number of such devices and/or systems may be provided in a client-server environment, and particular devices may be altogether absent. In other words, the client-server environment 100 is merely an example provided to discuss more pertinent features of the present disclosure.

Figure 2:
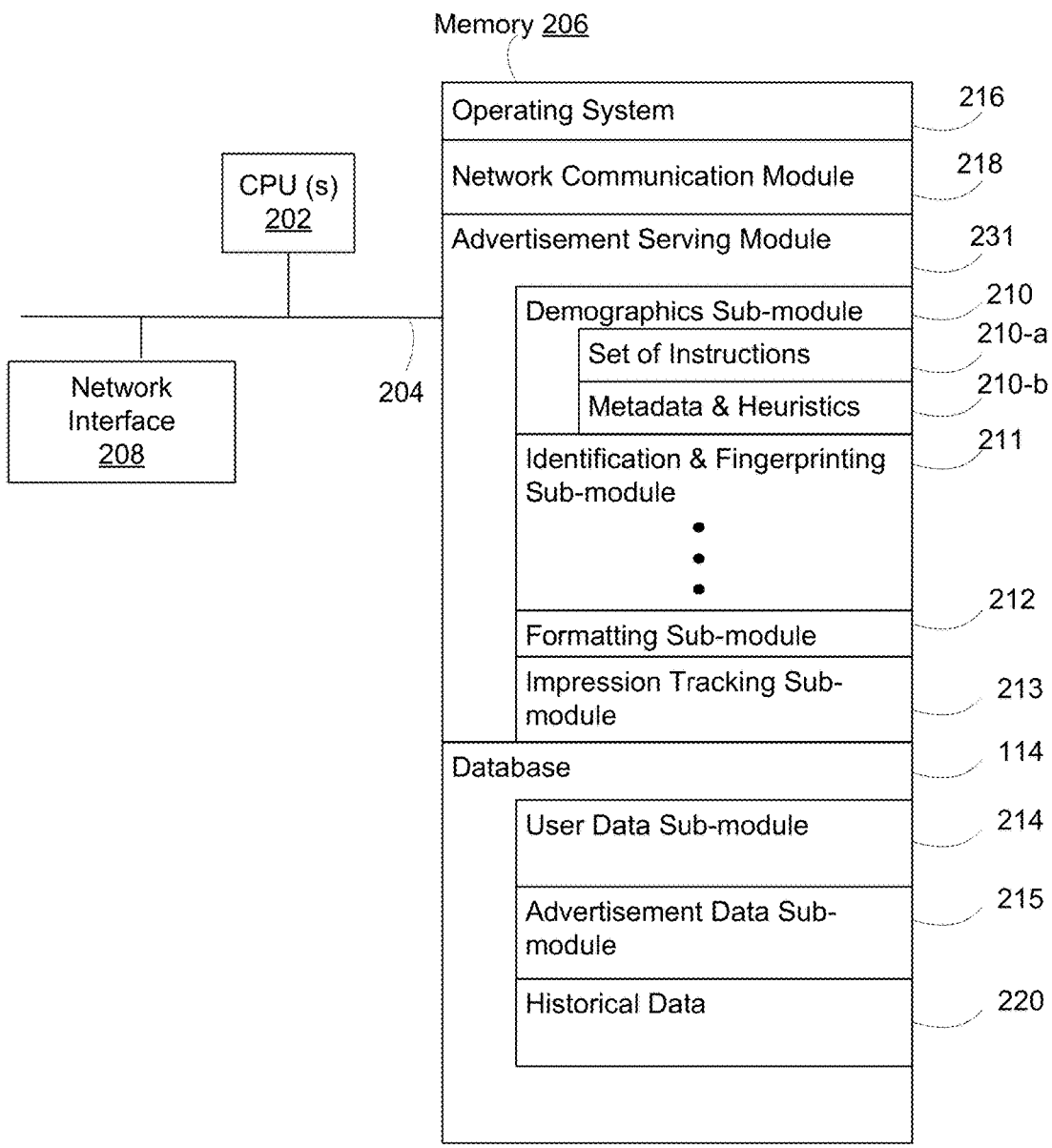
FIG. 2 is a block diagram illustrating an ad server system, in accordance with some implementations.

FIG. 2 is a block diagram illustrating an example of an ad server system 111-*b*, discussed above with reference to FIG. 1, in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the ad server system 111-*b* includes one or more processing units (CPUs) 202, one or more network or other communications interfaces 208, memory 206, and one or more communication buses 204 for interconnecting these and various other components. The communication buses 204 may include circuitry (sometimes called a chipset) that interconnects and controls communications between system components. Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, including the non-volatile and volatile memory device(s) within memory 206, comprises a non-transitory computer readable storage medium.

In some implementations, memory 206 or the non-transitory computer readable storage medium of memory 206 stores the following programs, modules and data structures, or a subset thereof including an operating system 216, a network communication module 218, an advertisement serving module 231, and a database 114.

The operating system 216 includes procedures for handling various basic system services and for performing hardware dependent tasks.

The network communication module 218 facilitates communication with other devices (e.g., other server systems 111 as well as client devices 108/110) via the one or more network interfaces 208 (wired or wireless) and one or more communication networks, such as the Internet, other wide area networks, local area networks, metropolitan area networks, and so on.

The advertisement serving module 231 is configured to receive an advertisement request for an advertisement (e.g., from a client device 108/110, or an advertisement mediator service) to be served to the client device 108/110. For example, in some circumstances, the request originates from a mobile device and includes an indication that the advertisement is to be provided to the user in a respective one of a mobile web browser or a mobile app. In some implementations, the advertisement serving module 231 selects a respective multimedia advertisement from a plurality of multimedia advertisements being stored on the server system (e.g., based on demographic information obtained using from a user's branding profile). In some implementations, the respective multimedia advertisement includes a question and a plurality of predetermined user responses to the question. The advertisement serving module 231 transmits the respective multimedia advertisement to the client device, and receives, from the client device, a respective user response of the plurality of predetermined user responses to the question.

In some embodiments, the advertisement serving module 231 optionally includes several sub-modules, each including a set of instructions and optionally including metadata. For example, in some implementations, the advertisement serving module 231 includes a demographics sub-module 210 that includes a set of instructions 210-a and metadata 210-b. The demographics sub-module selects a multimedia advertisement in accordance with demographics stored in a user's branding profile. More specifically, the demographics sub-module 210 receives demographic information including one or more demographics from the branding profile that has been accessed by the identification and identification and fingerprinting sub-module 211 (explained below). The demographics sub-module 210 selects an advertising campaign in accordance with the one or more demographics. The advertising campaigns are stored in the advertisement data sub-module 215. The advertising campaign includes a pool of multimedia advertisements and a pool of questions. The advertising campaign is associated with a subset of the one or more demographics. The demographics sub-module 210 selects, from the advertising campaign, a multimedia advertisement from the pool of multimedia advertisements and a question from the pool of questions. The question is associated with a plurality of predefined answers to the question. The demographics sub-module 210 transmits instructions to the client device for presenting the multimedia advertisement, concurrently presenting the question, and providing affordances on the client device to receive an answer to the question.

Similarly, the advertisement serving module 231 optionally includes a identification and fingerprinting sub-module 211. The identification and fingerprinting sub-module 211 is configured to receive an ad request from a client device 108/110 and access a branding profile corresponding to a client device (e.g., branding profile 1002), which is stored in the user data sub-module 214. The branding profile includes the one or more demographics associated with a user of the client device. In some embodiments, the identification and fingerprinting sub-module 211 accesses the branding profile using at least one of a plurality of distinct identifiers corresponding to the client device. For example, in some embodiments, the plurality of identifiers includes a device issued identifier, a cookie identifier, and a device fingerprint identifier. In some embodiments, the identification and fingerprinting sub-module 211 receives fingerprinting information and maps the fingerprinting information onto the device fingerprint identifier. In some embodiments, the identification and fingerprinting sub-module 211 accesses the branding profile using more than one identifier of the plurality of identifiers and manages conflicts if the multiple identifiers do not access the same branding profile. For example, if the identification and fingerprinting sub-module 211 accesses a branding profile using a device issued ID (e.g., an IDFA or Android ID) and determines that the device fingerprint identifier stored in the branding profile (e.g., fingerprint ID 1004-3) does not match a device fingerprint ID generated in accordance with the ad request, the identification and fingerprinting sub-module 211 will replace the branding profile's device fingerprint ID with the determined fingerprint ID.

The advertisement serving module 231 also optionally includes a formatting sub-module 212 for formatting the served advertisements (e.g., for the respective one of the mobile browser or mobile app).

Finally, the advertisement serving module 231 optionally includes an impression tracking sub-module 213. The impression tracking module 213 is configured receive, from the client device, a response (sometimes called an "impression") corresponding to one of the predefined answers to the question and store the response in historical data 220. The impression tracking sub-module 213 also updates the user's branding profile to reflect new determined demographics, or changes in demographics, in accordance with the user's response to the question. In some embodiments, the impression tracking sub-module 213 monitors and reports to advertisers various metrics (e.g., viewable impressions, clicks, etc.) indicating the success of their advertisements.

The database 114 optionally includes one or more sub-modules for storing data related to the ad server system 111-b. The one or more sub-modules optionally include a user data sub-module 214 for storing users' branding profiles (e.g., the branding profile 1002, FIG. 10). In some implementations, the user data sub-module 214 includes a listing of advertisements for which the user has already answered an accompanying question, as described in more detail below. The database 114 also includes an advertisement data sub-module 215 that includes advertisement data for advertising campaigns. In some embodiments, the advertising data includes information corresponding to a pool of multimedia advertisements (e.g., URLs pointing to where the advertisements are stored), a pool questions relating to the advertising campaign (e.g., "Do you want to see this movie?"), potential answers to the questions (e.g., "Yes," and "No"), demographic information identifying advertisements as particularly relevant to particular demographic classifications (e.g., to serve user's advertisements more likely to be interesting to them), etc. Finally, the database 114 optionally includes historical data 220. In some embodiments, user responses to questions (impressions) are index and stored in historical data 220 along with demographic information to support future searching and data mining.

Figure 3:
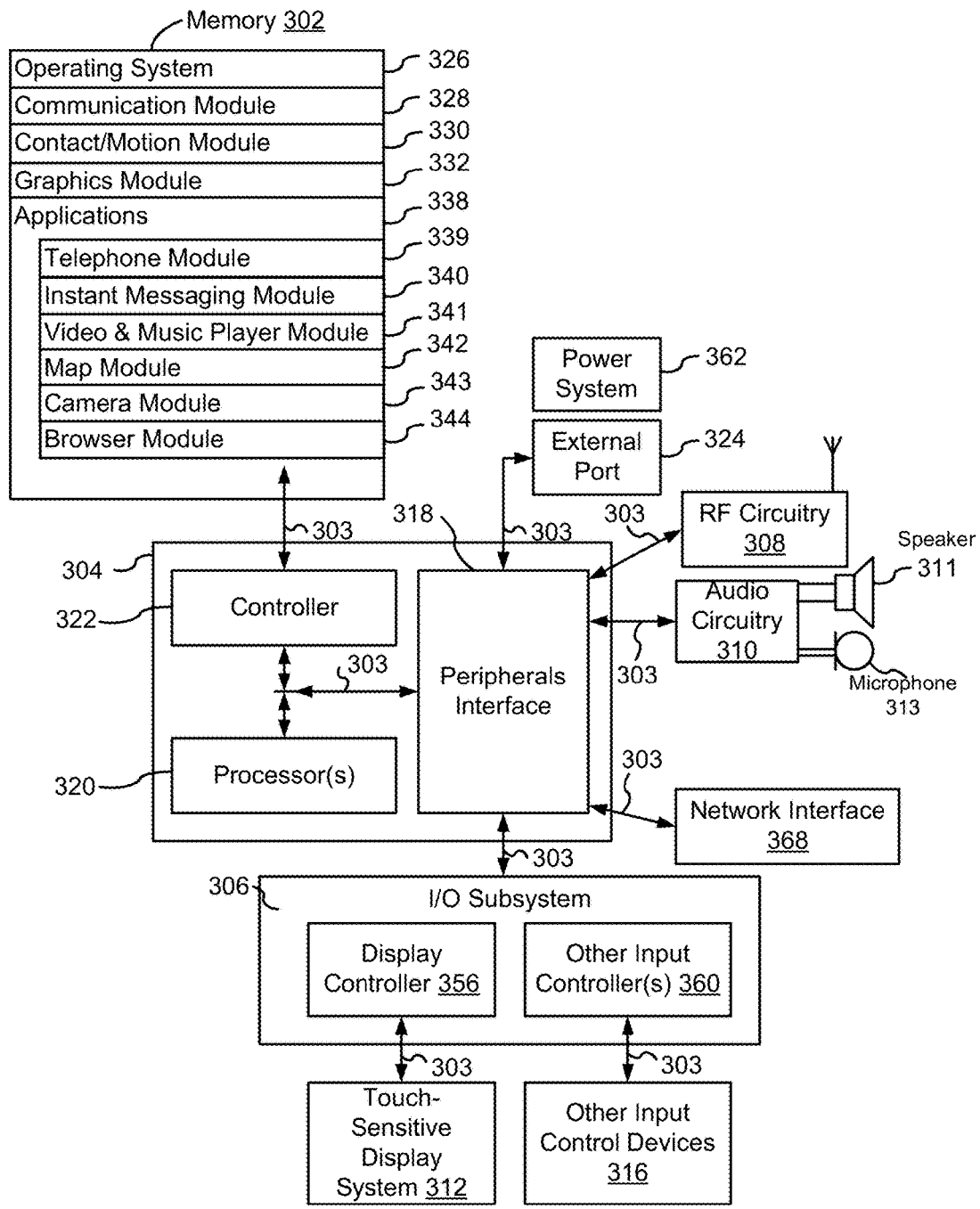
FIG. 3 is a block diagram illustrating a client device, in accordance with some implementations.

Attention is now directed toward implementations of client devices. FIG. 3 is a block diagram illustrating a client device 108/110, in accordance with some implementations. In some implementations, the client device 108/110 is a smart phone, a laptop computer, a desktop computer, a tablet computer, a multimedia player device, a navigation device, an educational device (such as a child's learning toy), a gaming system, or a smart television. In some implementations, the client device 108/110 includes a touch-sensitive display 312 that is sometimes called a "touch screen" for convenience, and is sometimes known as or called a touch-sensitive display system. The client device 108/110 includes memory 302 (which optionally includes one or more computer readable storage media), a memory controller 322, one or more processing units (CPUs) 320, a peripherals interface 318, RF circuitry 308, audio circuitry 310, a speaker 311, a microphone 313, an input/output (I/O) subsystem 306, other input or control devices 316, and an external port 324. These components optionally communicate over one or more communication buses or signal lines 303.

It should be appreciated that client device 108/110 is only one example of a client device, and that client device 108/110 optionally has more or fewer components than shown, optionally combines two or more components, or optionally has a different configuration or arrangement of the components. The various components shown in FIG. 3 are implemented in hardware, software, or a combination of both hardware and software, including one or more signal processing and/or application specific integrated circuits.

Memory 302 optionally includes high-speed random access memory and optionally also includes non-volatile memory, such as one or more magnetic disk storage devices, flash memory devices, or other non-volatile solid-state memory devices. Access to memory 302 by other components of client device 108/110, such as the CPU 320 and the peripherals interface 318, is, optionally, controlled by the memory controller 322.

The peripherals interface 318 can be used to couple input and output peripherals of the device to the CPU 320 and memory 302. The one or more processors 320 run or execute various software programs and/or sets of instructions stored in memory 302 to perform various functions for the client device 108/110 and to process data.

In some implementations, the peripherals interface 318, CPU 320, and memory controller 322 are, optionally, implemented on a single chip, such as a chip 304. In some other implementations, they are, optionally, implemented on separate chips.

The RF (radio frequency) circuitry 308 receives and sends RF signals, also called electromagnetic signals. The RF circuitry 308 converts electrical signals to/from electromagnetic signals and communicates with communications networks (e.g., the communications network 106, FIG. 1) and other communications devices (e.g., the base station 103, FIG. 1) via the electromagnetic signals. The RF circuitry 308 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 308 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The audio circuitry 310, speaker 311, and microphone 313 provide an audio interface between a user and the client device 108/110. The audio circuitry 310 receives audio data from the peripherals interface 318, converts the audio data to an electrical signal, and transmits the electrical signal to the speaker 311. The speaker 311 converts the electrical signal to human-audible sound waves. The audio circuitry 310 also receives electrical signals converted by the microphone 313 from sound waves. The audio circuitry 310 converts the electrical signal to audio data and transmits the audio data to the peripherals interface 318 for processing. Audio data is, optionally, retrieved from and/or transmitted to memory 302 and/or the RF circuitry 308 by the peripherals interface 318. In some implementations, the audio circuitry 310 also includes a headset jack. The headset jack provides an interface between the audio circuitry 310 and removable audio input/output peripherals, such as output-only headphones or a headset with both output (e.g., a headphone for one or both ears) and input (e.g., a microphone).

The I/O subsystem 306 couples input/output peripherals on the client device 108/110, such as a touch screen 312 and the other input control devices 316, to the peripherals interface 318. The I/O subsystem 306 optionally includes a display controller 356, and one or more input controllers 360 for other input or control devices. The one or more input controllers 360 receive/send electrical signals from/to other input or the control devices 316. The other input control devices 316 optionally include physical buttons (e.g., push buttons, rocker buttons, etc.), dials, slider switches, joysticks, click wheels, and so forth. In some alternate implementations, the input controller(s) 360 are, optionally, coupled to any (or none) of the following: a keyboard, infrared port, USB port, and a pointer device such as a mouse. The one or more buttons optionally include an up/down button for volume control of the speaker 311 and/or the microphone 313. The one or more buttons optionally include a push button.

The touch-sensitive display 312 provides an input interface and an output interface between the device and a user. The display controller 356 receives and/or sends electrical signals from/to the touch screen 312. The touch screen 312 displays visual output to the user. The visual output optionally includes graphics, text, icons, video, and any combination thereof (collectively termed "graphics"). In some implementations, some or all of the visual output corresponds to user-interface objects.

The touch screen 312 has a touch-sensitive surface, sensor or set of sensors that accepts input from the user based on haptic and/or tactile contact. The touch screen 312 and the display controller 356 (along with any associated modules and/or sets of instructions in memory 302) detect contact (and any movement or breaking of the contact) on the touch screen 312 and converts the detected contact into interaction with user-interface objects (e.g., one or more soft keys, icons, web pages or images) that are displayed on the touch screen 312. In an exemplary implementation, a point of contact between the touch screen 312 and the user corresponds to a finger of the user.

The touch screen 312 optionally uses LCD (liquid crystal display) technology, LPD (light emitting polymer display) technology, or LED (light emitting diode) technology, although other display technologies are used in other implementations. The touch screen 312 and the display controller 356 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch screen 312.

In some implementations, in addition to the touch screen, the client device 108/110 optionally includes a touchpad (not shown) for activating or deactivating particular functions. In some implementations, the touchpad is a touch-sensitive area of the device that, unlike the touch screen, does not display visual output. The touchpad is, optionally, a touch-sensitive surface that is separate from the touch screen 312 or an extension of the touch-sensitive surface formed by the touch screen.

The client device 108/110 also includes a power system 362 for powering the various components. The power system 362 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some implementations, the software components stored in memory 302 include an operating system 326, communication module (or set of instructions) 328, a contact/motion module (or set of instructions) 330, a graphics module (or set of instructions) 332, and one or more applications (or sets of instructions) 338.

The operating system 326 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 328 facilitates communication with other devices over one or more external ports 324 and also includes various software components for handling data received by the RF circuitry 308 and/or the external port 324. The external port 324 (e.g., Universal Serial Bus (USB), FIREWIRE, etc.) is adapted for coupling directly to other devices or indirectly over a network (e.g., the Internet, wireless LAN, etc.).

The contact/motion module 330 optionally detects contact with the touch screen 312 (in conjunction with a display controller 356) and other touch sensitive devices (e.g., a touchpad or physical click wheel). The contact/motion module 330 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 330 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some implementations, the contact/motion module 330 and the display controller 356 detect contact on a touchpad.

The graphics module 332 includes various known software components for rendering and displaying graphics on the touch screen 312 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some implementations, the graphics module 332 stores data representing graphics to be used. Each graphic is, optionally, assigned a corresponding code. The graphics module 332 receives, from applications etc., one or more codes specifying graphics to be displayed along with, if necessary, coordinate data and other graphic property data, and then generates screen image data to output to the display controller 356.

The one or more applications 336 optionally include the following modules (or sets of instructions), or a subset or superset thereof:

a telephone module 339;
an instant messaging (IM) module 340;
a video & music player module 341;
a map module 342;
a camera module 343;
a browser module 344;

In conjunction with the touch screen 312, the display controller 356, the contact module 330, and the graphics module 332, and the one or more other applications (e.g., video & music player module or browser module 343) are, optionally, used to provide a user of the client device 108/110 with a multimedia advertisement that includes a question and a plurality of predefined answers to the question. For example, in some implementations, the video & music player module 341 is an app for streaming video and music service (e.g., music videos are streamed to the client device 108/110 for the user's entertainment). In some circumstances, in order to provide free or inexpensive video and music streaming, the service intersperses the music videos with multimedia advertisements. For example, after a music video ends, the service may play a multimedia advertisement (e.g., having video and sound components) for an upcoming movie, while displaying (or, for example, audibly outputting in conjunction with the audio circuitry 310 and the speaker 311) the question, "Do you plan to see this movie"). In some implementations, the device also provides the plurality of predefined answers to the question (e.g., "Yes," or "No") in an analogous manner (e.g., displayed on the screen, audibly output, etc.). The client device 108/110 may use any of its various input mechanisms (e.g., with the I/O subsystem 306, or the microphone 313) to receive an answer to the question, and transmit the answer (e.g., through the external port 324, the network interface 368 and/or the RF circuit 308) to a server system (e.g., the ad server system 111-*b*, FIGS. 1 and 2).

Each of the above identified modules and applications corresponds to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various implementations. In some implementations, memory 302 optionally stores a subset of the modules and data structures identified above. Furthermore, memory 302 optionally stores additional modules and data structures not described above.

FIGS. 4A-4G illustrate user interfaces for multimedia advertising, in accordance with some implementations. The user interfaces in these figures are used to illustrate the processes described below, including the processes in FIGS. 6A-6C, FIGS. 7A-7B, and FIGS. 8A-8D. For convenience of explanation, these user interfaces are illustrated with reference to a client device 108/110 with a touch screen display 312. In particular, these figures illustrate a sequence in which a user is presented with a multimedia advertisement that includes a question and a plurality of predefined user responses to the question. The user of the client device 108/110 votes (e.g., a selects one of the predefined user responses to the question) in order to close the advertisement and return to the user's desired content (e.g., a website or a mobile application).

Figure 4A:
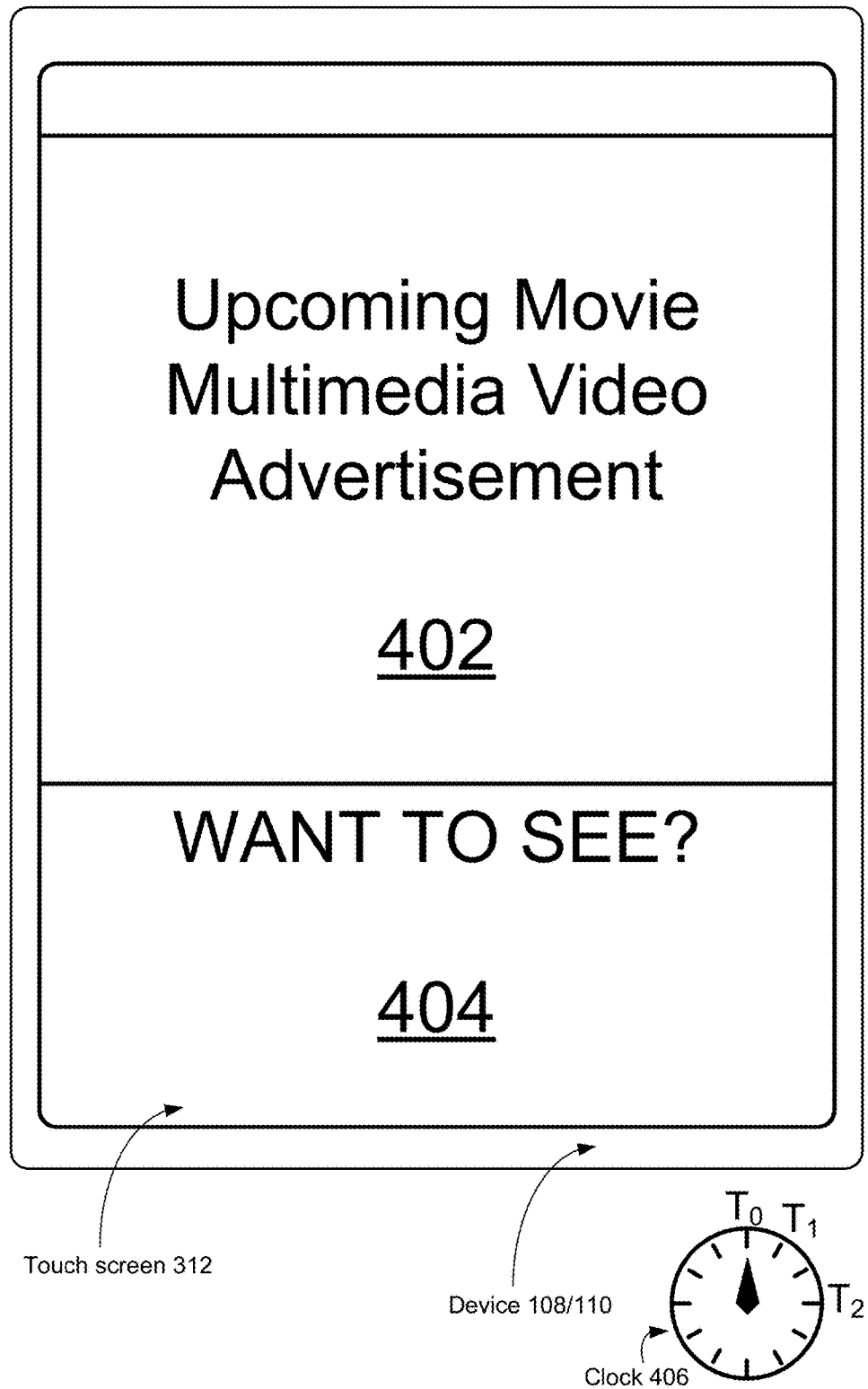
FIGS. 4A-4G illustrate user interfaces for online advertising, in accordance with some implementations.

In FIG. 4A, the client device 108/110 displays a full-page multimedia advertisement 402. In some implementations, the full-page multimedia advertisement 402 is partially transparent, meaning that the underlying content (e.g., a web page or a mobile app) is partially visible to the user. In some implementations (e.g., for a tablet device), the full-page multimedia advertisement 402 is smaller than a display area (e.g., the area of touch screen 312). In such implementations, the full-page multimedia advertisement, though smaller than the display area, is effectively large enough to block the user from viewing the underlying content.

In this example, the multimedia advertisement is a video advertisement for an upcoming movie (e.g., a "trailer" for a movie with an upcoming release date). The multimedia advertisement includes a question 404, "Want to see?" asking the user of the client device whether he or she intends to see the advertised movie. FIG. 4A also illustrates a clock 406, which is shown merely for convenience of explanation, illustrating the passage of time from a time $T_0$ corresponding to initiation of the multimedia advertisement. In some implementations, at the time $T_0$, the device does not display the user responses to the question nor does the device provide the user with a manner with which to respond to the question (e.g., a gesture on the touch screen 312 or a verbal response using voice-recognition), thus requiring the user to watch at least a predefined amount of the multimedia advertisement.

Figure 4B:

As shown in FIG. 4B, in some implementations, after a lapse of a first predetermined amount of time $T_1$, the device displays a plurality of affordances corresponding to the predefined user responses 408 to the question. In this example, the predefined user responses to the question includes two user responses within a slider bar 410, a response 408-a corresponding to "Yes," and a response 408-b corresponding to "No." In some implementations, the device also displays a visual cue to the user that voting will close the advertisement and allow the user to resume his or her desired activity (e.g., browsing a web page, and using a mobile app). In this example, the phrase "(Vote to close advertisement)" serves as such a visual cue.

Figure 4C:
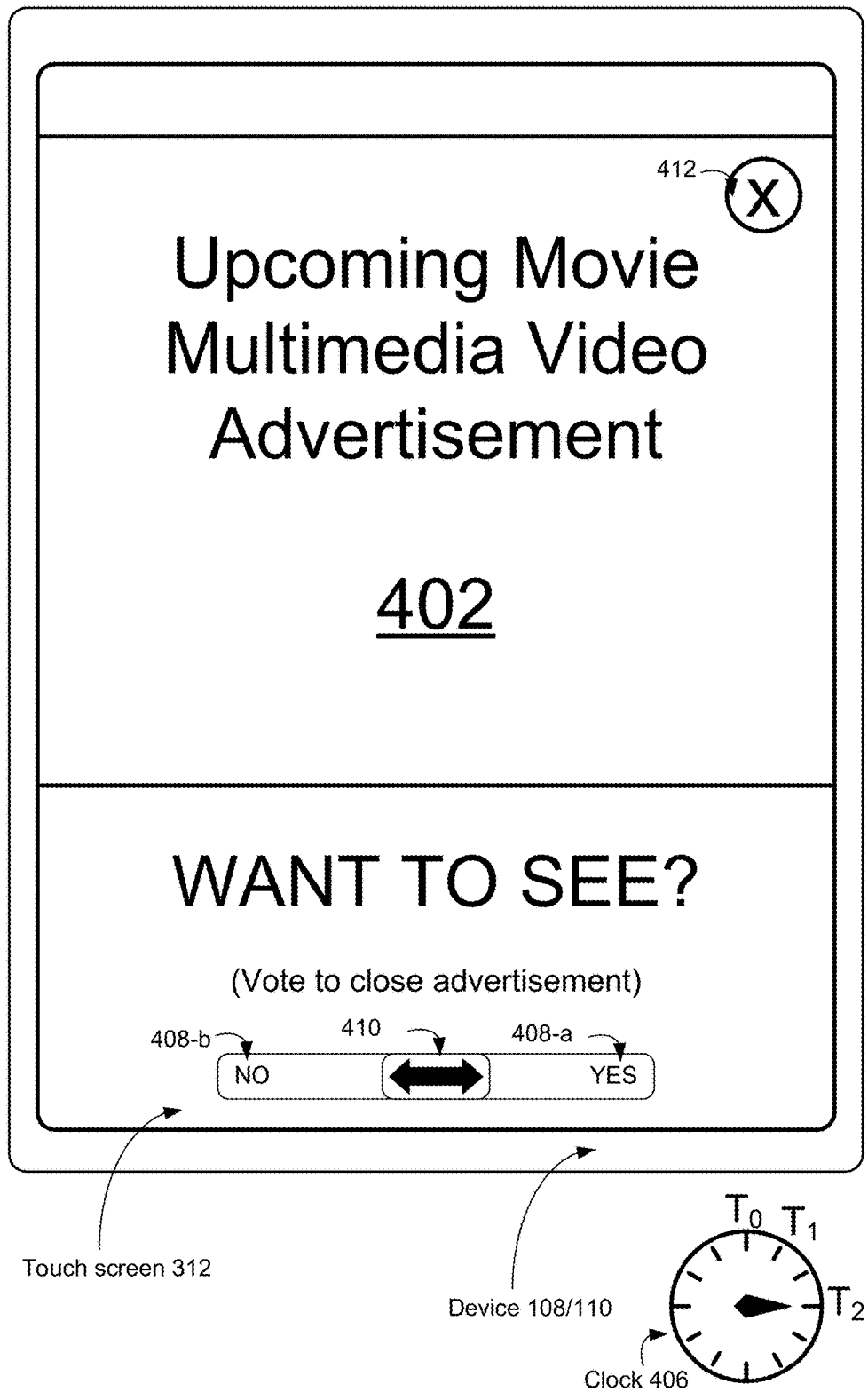

As shown in FIG. 4C, in some implementations, after a lapse of a second predetermined amount of time, the client device 108/110 displays an ad-skip affordance 412, selection of which causes the client device 108/110 to close the advertisement without registering a vote by the user (e.g., without the user answering the question).

Figure 4D:
Figure 4E:

FIG. 4D illustrates a scenario in which the device detects a contact 414 at a location designated by 414-a on the touch screen 312, in accordance with some implementations. As shown in FIG. 4E, the device detects movement of the gesture (e.g., movement while the contact 414 is continuously detected on the touch screen 312) to a location designated by 414-b. The movement of the contact, in this example, signifies a right-swipe gesture thereby selecting the "Yes" user response.

It should be understood that, although the contact 414 is illustrated after the appearance of the ad-skip affordance 412, in some implementations, the user is able to "vote to close" at any point in time after the device displays the plurality of affordances corresponding to the predefined user responses 408 to the question. That is to say, in some circumstances, the contact 414 is performed before the appearance of the ad-skip affordance 412.

Figure 4F:
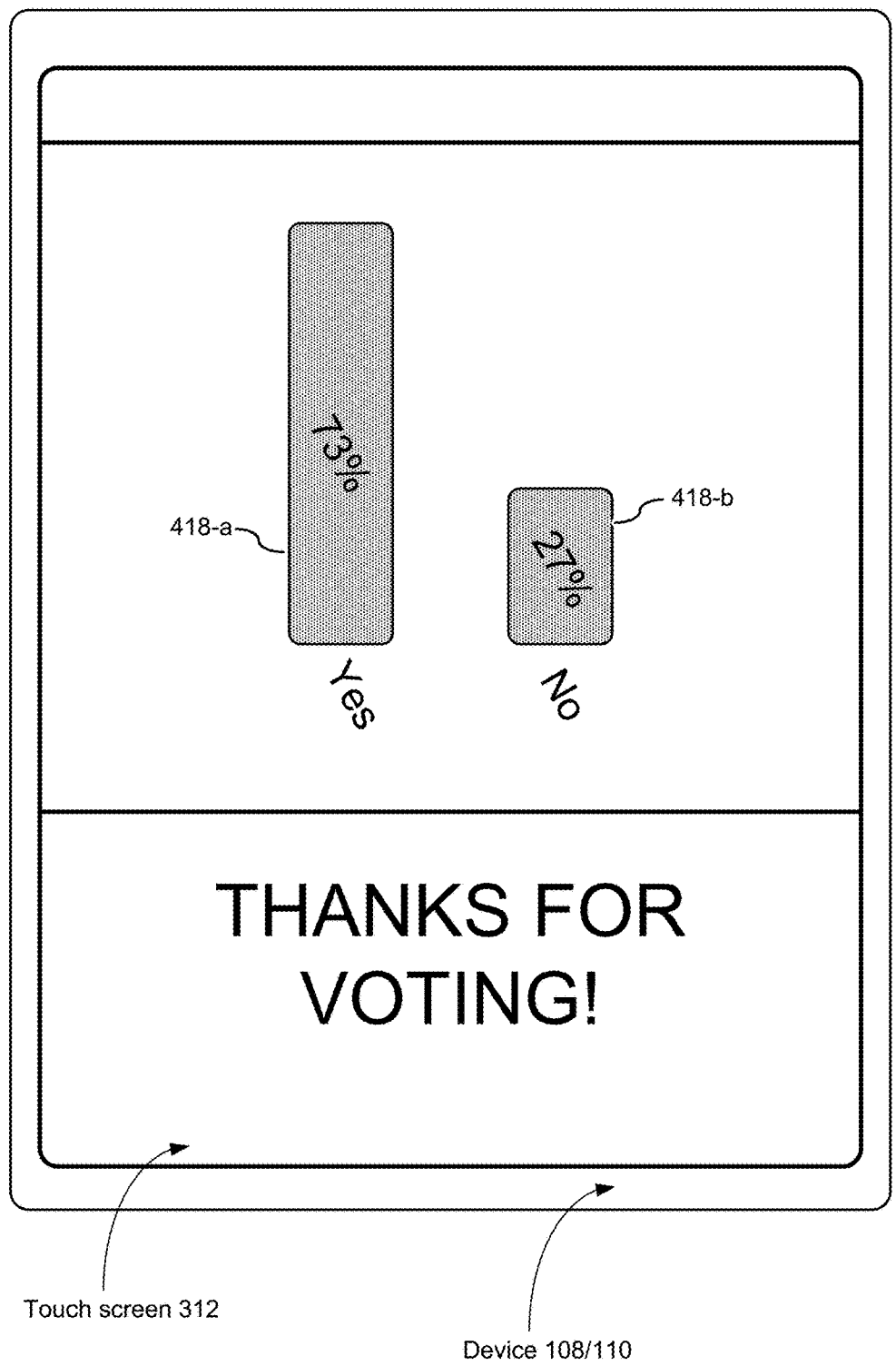

As shown in FIG. 4F, in some implementations, after a user response to the question is registered (e.g., detected and returned to the server) the device displays a representation of the information corresponding to an aggregated summary of the user responses. For example, as shown in FIG. 4F, the device displays a bar graph including bars 418 that illustrate the percentage of users who responded by answering "Yes" (418-a) and the percentage of users who responded by answering "No" (418-b). In some implementations, the display of the information corresponding to the aggregated summary of the user responses is an animated display. For example, the bars 418 "grow" in an animated fashion until reaching their respective heights determined by the underlying statistics (e.g., a height corresponding to 73% for the "Yes" answer and a height corresponding to 27% for the "No" answer). The display of this information (e.g., finding out how other people voted) is advantageous because it provides a reward to users for answering the question. This makes users more likely to engage with the advertisement and enjoy the experience of having the advertisement provided to them, which ultimately results in a more positive consumer impression of the advertiser and more effective advertising.

Figure 4G:

As shown in FIG. 4G, after the user has voted (e.g., selected a predefined response to the question) and the device has optionally displayed a representation of the information corresponding to the aggregated summary of the user responses, the device closes the advertisement, meaning that the entire screen, or nearly the entire screen is available for the user to continue his or her desired activities on the device. With that said, in some implementations, an optional banner through which the user can still access information corresponding to the advertisement continues to be displayed after the advertisement is closed.

FIGS. 5A-5D illustrate additional user interfaces for voting to close an advertisement, in accordance with some implementations. It should be appreciated that any of the user interface components depicted and described with reference to FIGS. 5A-5D may be combined or used in lieu of any of the user interface components described with reference to FIGS. 4A-4G or any other user interface component described with reference to FIGS. 5A-5D.

Figure 5A:
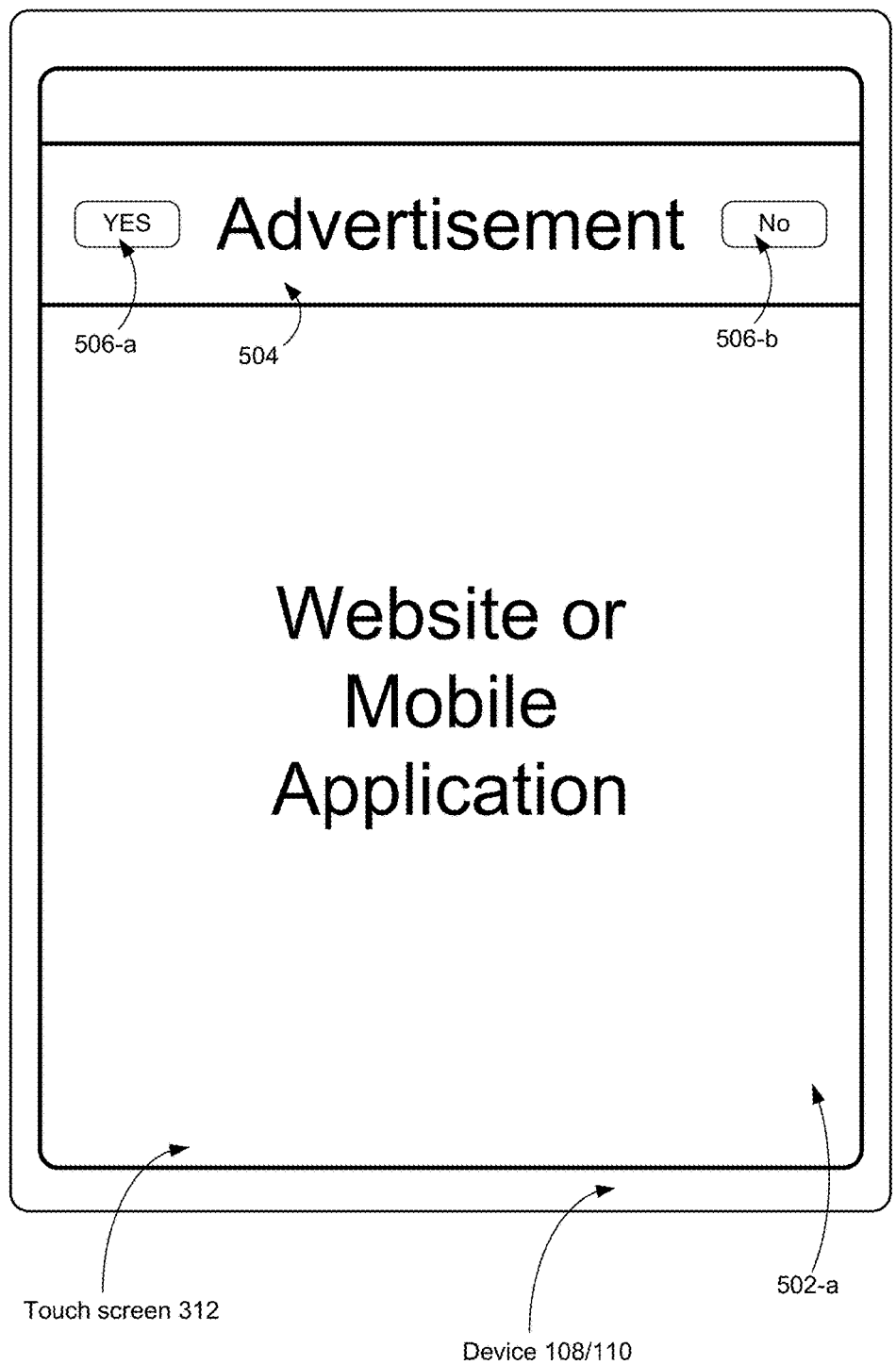
FIGS. 5A-5D illustrate additional user interfaces for online advertising, in accordance with some implementations.

FIG. 5A illustrates a graphical user interface 502-*a* for voting to close an advertisement. In accordance with some implementations, as shown in FIG. 5A, the advertisement is a banner multimedia advertisement 504 (sometimes referred to as a "banner advertisement"). The banner advertisement 504 includes a plurality of affordances (e.g., the buttons 506), each of which corresponds to a predefined user response to the question. In some implementations, the banner advertisement 504 includes a question such as "Do you plan to see this movie?" and the buttons 506 include a button 506-*a* corresponding to a "Yes" answer and a button 506-*b* corresponding to a "No" answer. In some implementations, the banner advertisement does not include buttons 506 and instead the device displays an animated transition between the banner advertisement 504 and a larger advertisement (e.g., the full-page multimedia advertisement 402, FIG. 4, or the medium-page multimedia advertisement 508, FIG. 5B). In such implementations, the plurality of affordances is presented in the larger advertisement. In some implementations, the banner advertisement 504 is partially transparent, meaning that the underlying content (e.g., a web page or a mobile app) is partially visible to the user.

Figure 5B:
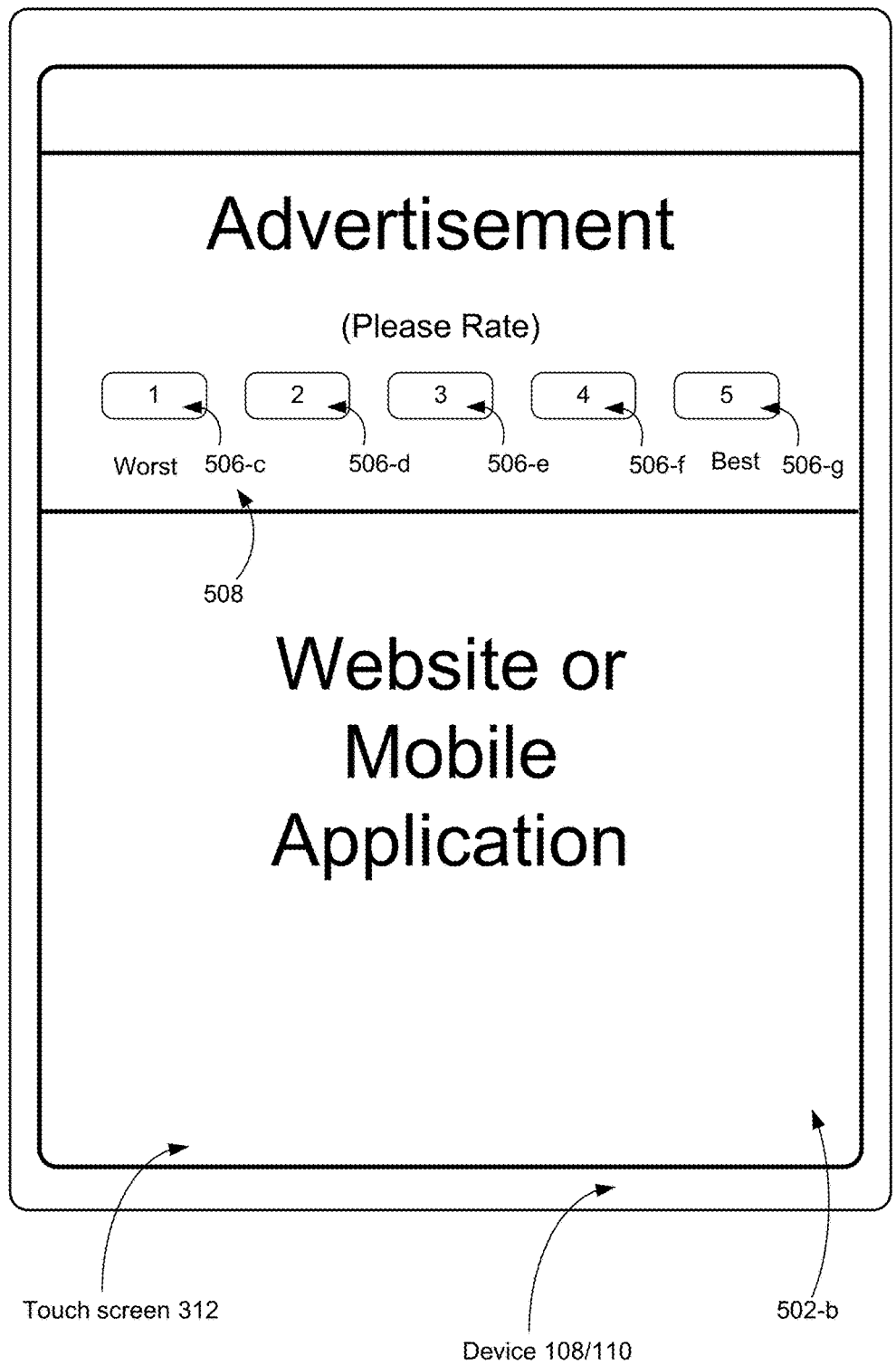

FIG. 5B illustrates a graphical user interface 502-*b* for voting to close an advertisement. In accordance with some implementations, as shown in FIG. 5B, the advertisement is a medium-page multimedia advertisement 508 (sometimes referred to as a "medium-page advertisement"). In this example, the plurality of affordances again includes buttons 506. However, in contrast to the graphical user interface 502-*a* shown in FIG. 5A, the buttons 506 include more than 2 buttons (e.g., buttons 506-*c* through 506-*g*). In some implementations, the question asks the user to provide a rating (e.g., a continuous or discrete value). For example, the medium-page multimedia advertisement 508 may include a question that asks the user to rate their cable service, and each of the buttons 506 in FIG. 5B corresponds to a value (e.g., a rating) between one and five that the user can enter in response to the question. In some implementations where there are more than 2 buttons (e.g., buttons 506-*c* through 506-*g*), each of the buttons corresponds to a different answer; e.g., each button can present one answer in a set of answers to a multiple choice question.

Figure 5C:
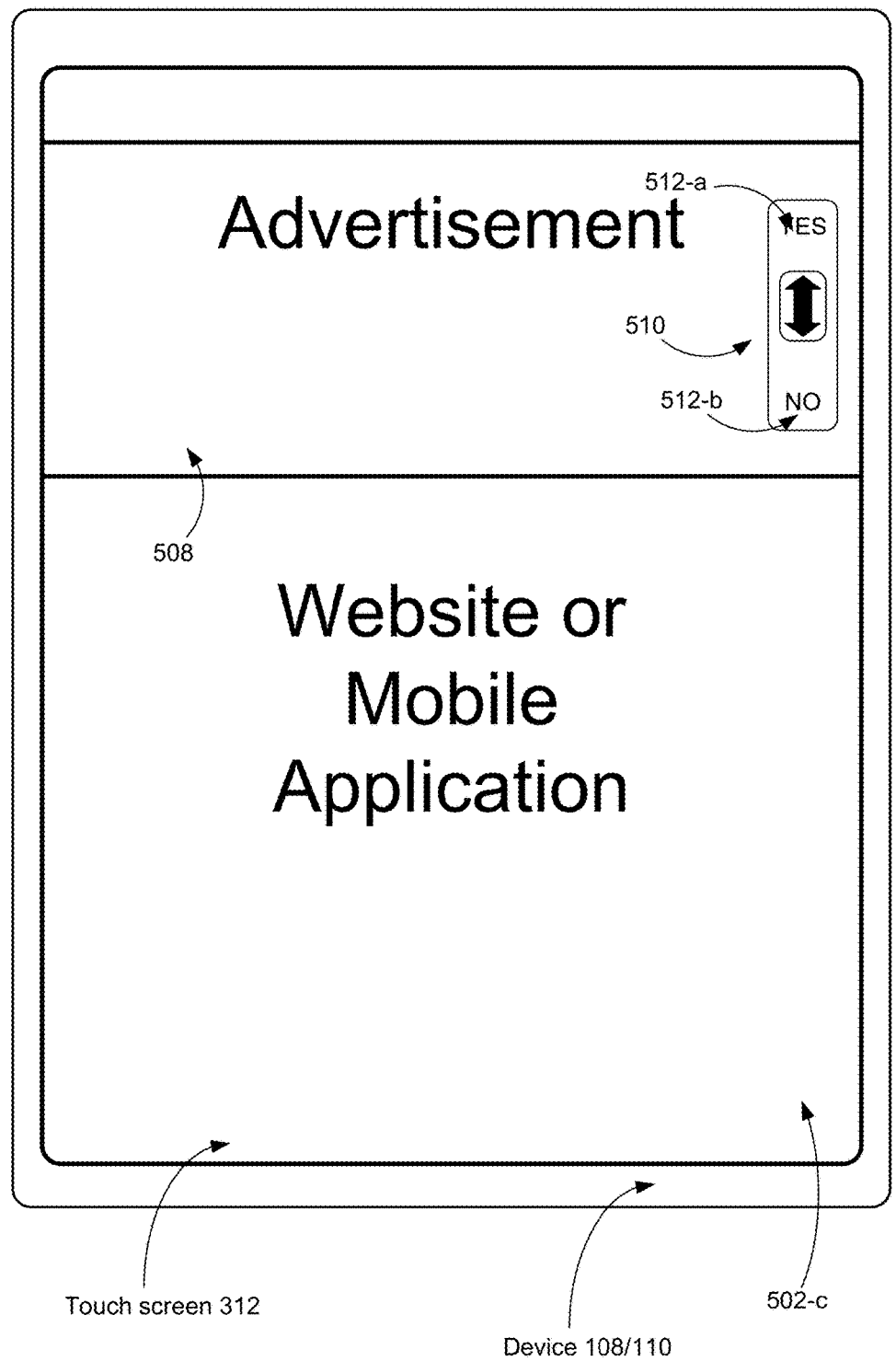

FIG. 5C illustrates a graphical user interface 502-*c* for voting to close an advertisement. The graphical user interface 502-*c* in FIG. 5C is analogous to the graphical user interface 502-*b* in FIG. 5B with the difference that the plurality of affordances in the graphical user interface 502-*c* a corresponding to the predefined user responses 512 to the question are provided via a vertical slider bar 510. In this example, the predefined user responses to the question includes two user responses: a response 512-*a* corresponding to "Yes," and a response 512-*b* corresponding to "No."

Figure 5D:
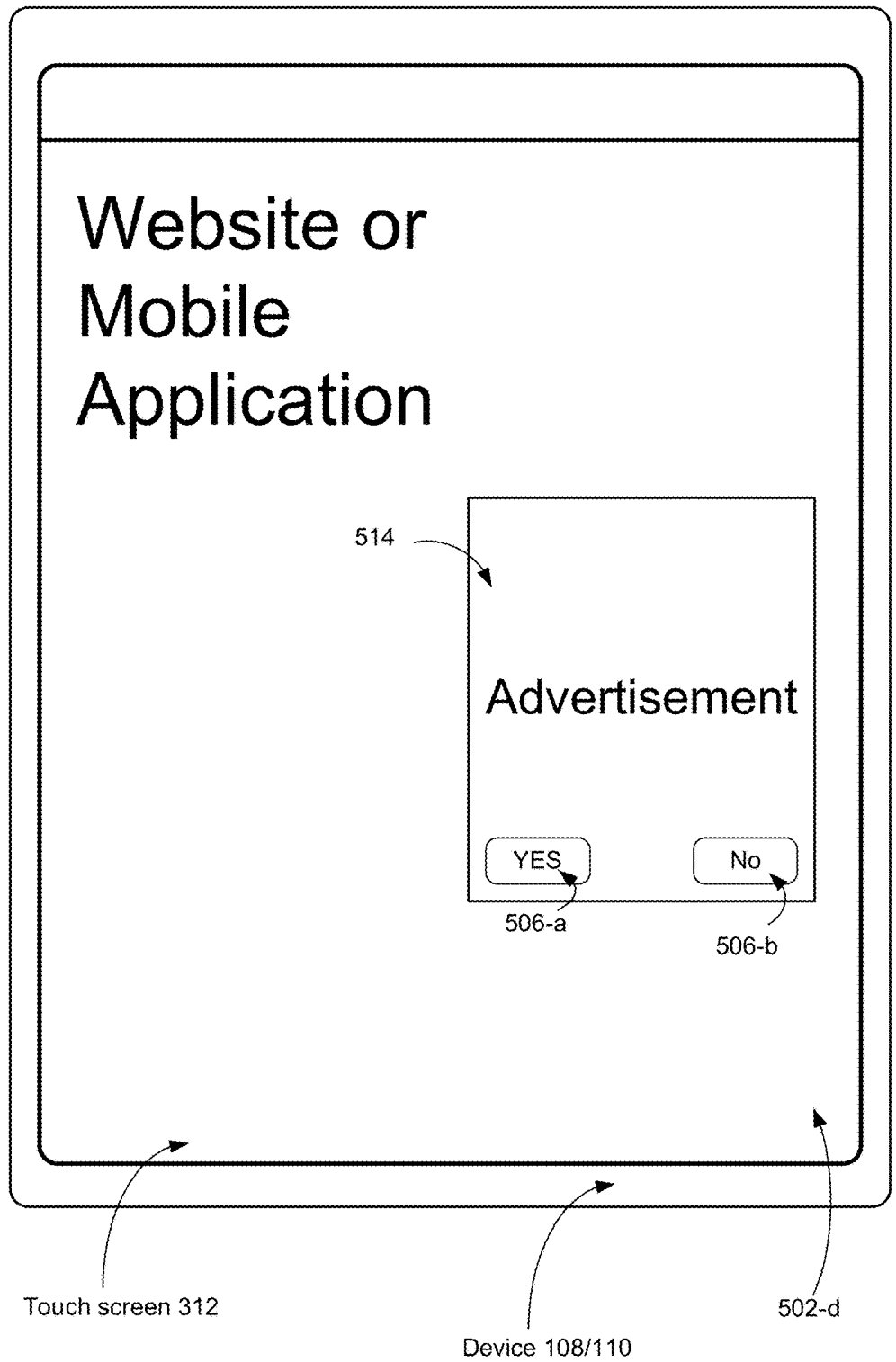

FIG. 5D illustrates a graphical user interface 502-*d* for voting to close an advertisement. The graphical user interface 502-*d* includes an embedded advertisement 514. In some implementations, the embedded advertisement 514 is embedded into a web page or a mobile application (e.g., when the user scrolls up or down within the web page, the embedded advertisement 514 moves correspondingly).

Figure 6A:
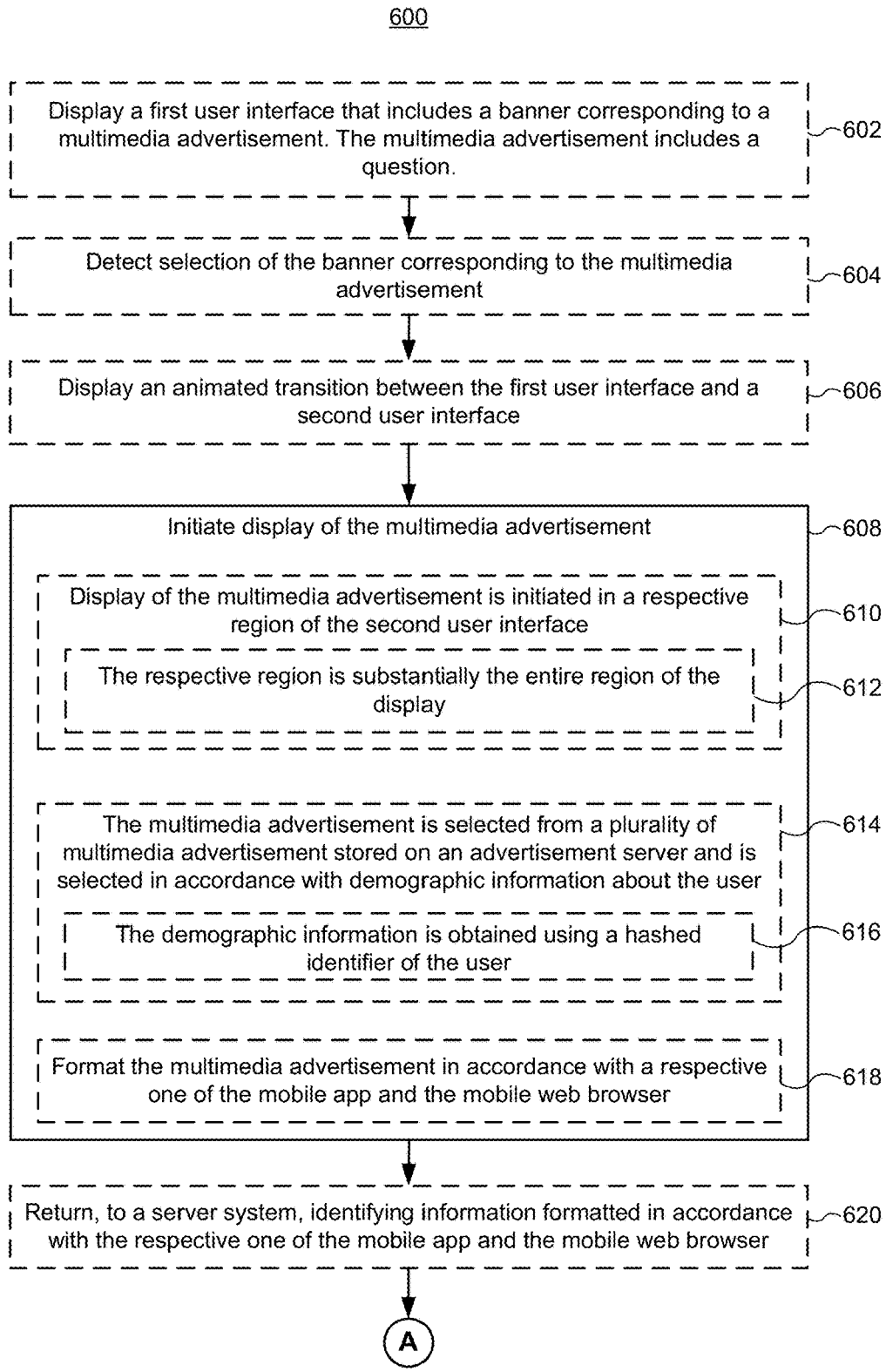
FIGS. 6A-6C are flow diagrams illustrating a method of online advertising, in accordance with some implementations.
Figure 6B:
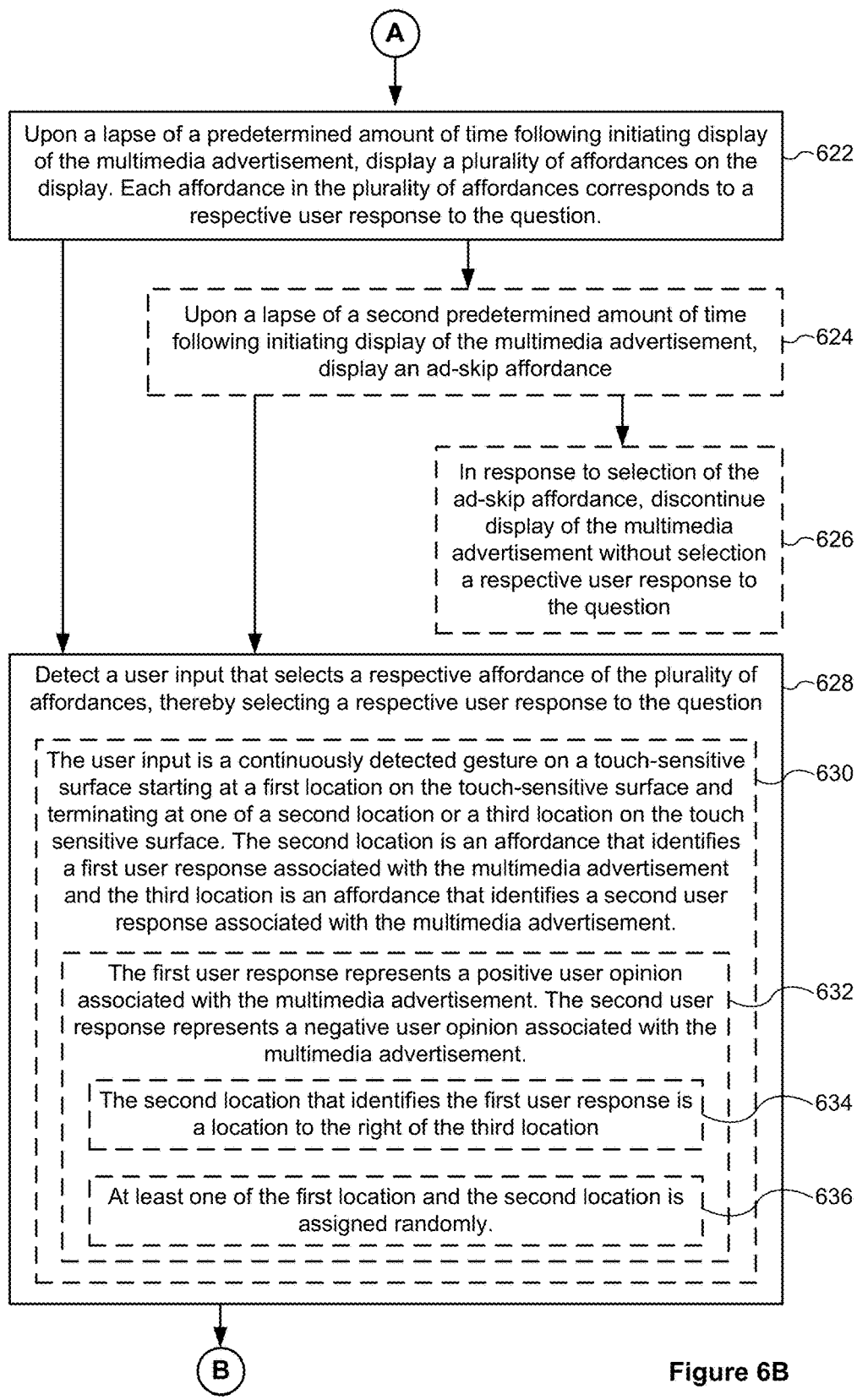
Figure 6C:
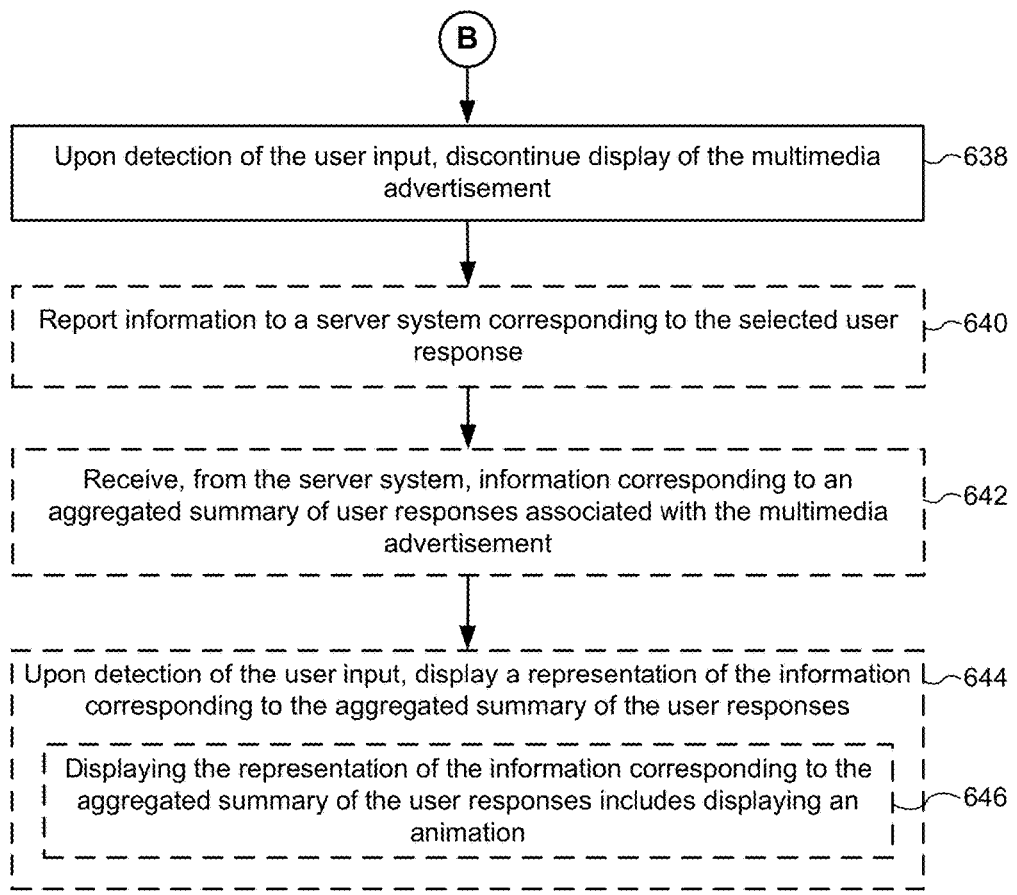

FIGS. 6A-6C are flow diagrams illustrating a method 600 of multimedia advertisement in accordance with some implementations. In particular, the method 600 is a method of "voting to close" a multimedia advertisement, in accordance with some implementations. In some implementations, the method 600 is performed at an electronic device (e.g., the client device 108/110) with a display. In some implementations, the display is a touch screen display (e.g., the touch screen 312, FIG. 3) and the touch-sensitive surface is on the display. In some implementations, the display is separate from an input device used by the user to vote.

In various implementations, some operations of the method 600 may be combined and/or the order of some operations may be changed from the order shown in the figures. Also, in some implementations, operations shown in separate figures and/or discussed in association with separate methods (e.g., method 700, FIGS. 7A-7B and/or method 800, FIGS. 8A-8D) may be combined to form other methods, and operations shown in the same figure and/or discussed in association with the same method may be separated into different methods. Moreover, in some implementations, one or more operations in the methods are performed by modules of the client device 108/110 shown in FIG. 3, including, for example, processor(s) 320, I/O subsystem 306, memory 302, network interface 368, and/or any sub modules thereof.

In some implementations, a server system (e.g., the ad server system 111-*b*, FIG. 1) instructs the client device to perform some or all of the operations of the method 600. Some operations in the method 600 are, optionally, combined and/or the order of some operations is, optionally, changed.

As described below, the method 600 provides an intuitive and engaging way of closing an advertisement. The method rewards a user for voting to close the advertisement rather than simply skipping the advertisement in at least two ways: (1) by allowing the user to close the advertisement sooner (by voting) and/or (2) by providing feedback to the user (e.g., as shown FIG. 4F) that is unavailable if the user simply skips the advertisement, thus creating a more efficient advertising interface that is more amenable to device users.

In some implementations, the device displays (602) a first user interface that includes a banner corresponding to a multimedia advertisement (e.g., the banner advertisement 504, FIG. 5A). The multimedia advertisement includes a question, which may or may not be displayed or otherwise presented to the user during display of the banner. In some implementations, the device detects (604) selection of the banner corresponding to the multimedia advertisement (e.g., via a user input such as a touch input or gesture located over the banner on a touch screen). Alternatively, the device need not detect selection of the banner in order to continue the method 600. In some implementations, the device displays (606) an animated transition between the first user interface and a second user interface (e.g., as shown in FIG. 4A).

The device initiates (608) display of the multimedia advertisement (e.g., the full-page multimedia advertisement 402, FIG. 4A, or any of the multimedia advertisements illustrated in FIGS. 5A-5D). In some implementations, display of the multimedia advertisement is initiated (610) in a respective region of the second user interface. In some implementations, the respective region is (612) substantially the entire region of the display, thus requiring the user to pay attention the multimedia advertisement before continuing with other user activities on the device (browsing the web, using an app, etc.). In some implementations, the question corresponding to the multimedia advertisement is displayed or otherwise presented to the user upon initiation of display of the multimedia advertisement.

In some implementations, the multimedia advertisement is selected (614) from a plurality of multimedia advertisements stored on an advertisement server and is selected in accordance with demographic information about the user. In some implementations, the demographic information is obtained (616) using an identifier (e.g., a hashed identifier)

of the user (e.g., a hashed email address, a unique identifier (UDID) value, an identifier for advertisers (IDFA/IFA) value, or a cookie ID value). In some implementations, the advertisement server uses the identifier to access a profile corresponding to the user (or to a demographic group to which the user belongs) in order to identify an advertisement that is of interest to the user.

In some implementations, the device formats (618) the multimedia advertisement in accordance with a respective one of the mobile app and the mobile web browser.

In some implementations, the device returns (620), to a server system (e.g., the ad server system 111-*b*, FIG. 1), identifying information formatted in accordance with the respective one of the mobile app and the mobile web browser. In some implementations, the identifying information is used by the identification and fingerprinting submodule 211 to produce a unique (or nearly so) user identifier (e.g., a fingerprint ID) that can be matched to identifying information formatted in accordance with the other one of the mobile app and the mobile web browser. The unique user identifier can then be used to be used to construct and maintain a single profile for the user (e.g., with demographic information, voting history information, etc.) using information obtained from both the user's mobile browser and the user's mobile applications.

Upon a lapse of a predetermined amount of time following initiating display of the multimedia advertisement, the device displays (622) a plurality of affordances on the display. Each affordance in the plurality of affordances corresponds to a respective user response to the question. For example, as shown in FIG. 4B, the device displays a slider bar 410 with a plurality of affordances corresponding to respective user responses to the question (e.g., the responses 408-*a* and 408-*b*).

In some implementations, upon a lapse of a second predetermined amount of time following initiating display of the multimedia advertisement, the device displays (624) an ad-skip affordance (e.g., the ad-skip affordance 412, FIG. 4C). In response to selection of the ad-skip affordance, the device discontinues (626) display of the multimedia advertisement without selection a respective user response to the question.

Assuming that the ad-skip affordance has not been selected, and the multimedia advertisement continues to be displayed, the device detects (628) a user input that selects a respective affordance of the plurality of affordances, thereby selecting a respective user response to the question.

In some implementations, the user input is (630) a continuously detected gesture on a touch-sensitive surface starting at a first location on the touch-sensitive surface and terminating at one of a second location or a third location on the touch sensitive surface (e.g., the contact 414, FIGS. 4D and 4E). The second location is an affordance that identifies a first user response (e.g., the response 408-*a*, FIG. 4D) associated with the multimedia advertisement and the third location is an affordance that identifies a second user response associated with the multimedia advertisement (the response 408-*b*, FIG. 4D). In some implementations, the first user response represents (632) a positive user opinion associated with the multimedia advertisement. The second user response represents a negative user opinion associated with the multimedia advertisement. In some implementations, the second location that identifies the first user response is (634) a location to the right of the third location. Positioning the positive user response to the right of the third location in some implementations takes advantage of a natural bias of mobile device users to swipe from left-to-right. This observation is based on the prevalence of left-to-right swiping unlock features. Thus, positioning the positive user response to the right of the third location is a tactic that can be employed at the request of advertisers to increase the number of positive responses to the question, which can be particularly useful when an aggregated summary of user responses is displayed to the user after the user votes (e.g., as described with reference to FIG. 4F, and operations 640 through 646 of method 600), thereby presenting a positive market consensus opinion of the product or service being advertised.

In some circumstances, an advertiser may wish to remove such a bias from user responses to the questions. To that end, in some implementations, at least one of the first location and the second location is (636) assigned randomly. This tactic can be particularly useful when accurate data (e.g., data from user responses) is needed, for example, during branding campaigns (e.g., branding surveys), and for data mining as described with reference to the method 800 (FIGS. 8A-8D).

In any event, upon detection of the user input, the device discontinues (638) display of the multimedia advertisement. Thus, in some implementations, the user may "vote to close" the advertisement.

In some implementations, the device reports (640) information to a server system corresponding to the selected user response and receives (642), from the server system, information corresponding to an aggregated summary of user responses associated with the multimedia advertisement.

In some implementations, upon detection of the user input, the device displays (644) a representation of the information corresponding to the aggregated summary of the user responses (e.g., as shown in FIG. 4F). In some implementations, displaying the representation of the information corresponding to the aggregated summary of the user responses includes (646) displaying an animation. For example, in some implementations, the device displays an animation of the multimedia advertisement "fading out" to reveal the representation of user responses. Alternatively, or in addition, as described with reference to FIG. 4F, the representation includes bars (i.e., of a bar graph) representing respective user responses and the bars "grow" in an animated fashion until reaching their respective heights as determined by the underlying statistics.

It should be understood that the particular order in which the operations in FIGS. 6A-6C have been described is merely exemplary and is not intended to indicate that the described order is the only order in which the operations could be performed. One of ordinary skill in the art would recognize various ways to reorder the operations described herein.

Figure 7A:
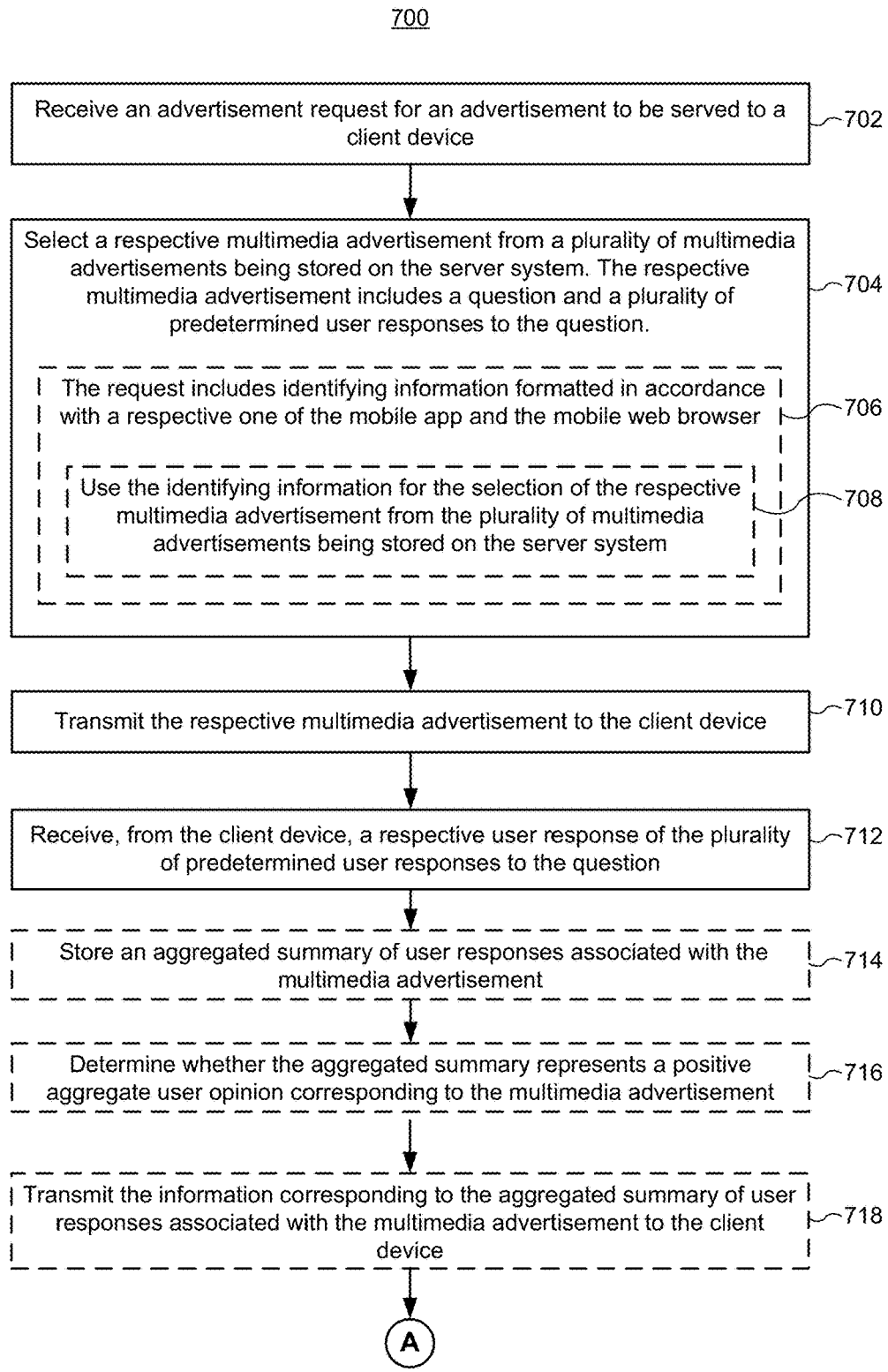
FIGS. 7A-7B are flow diagrams illustrating a method of online advertising, in accordance with some implementations.
Figure 7B:
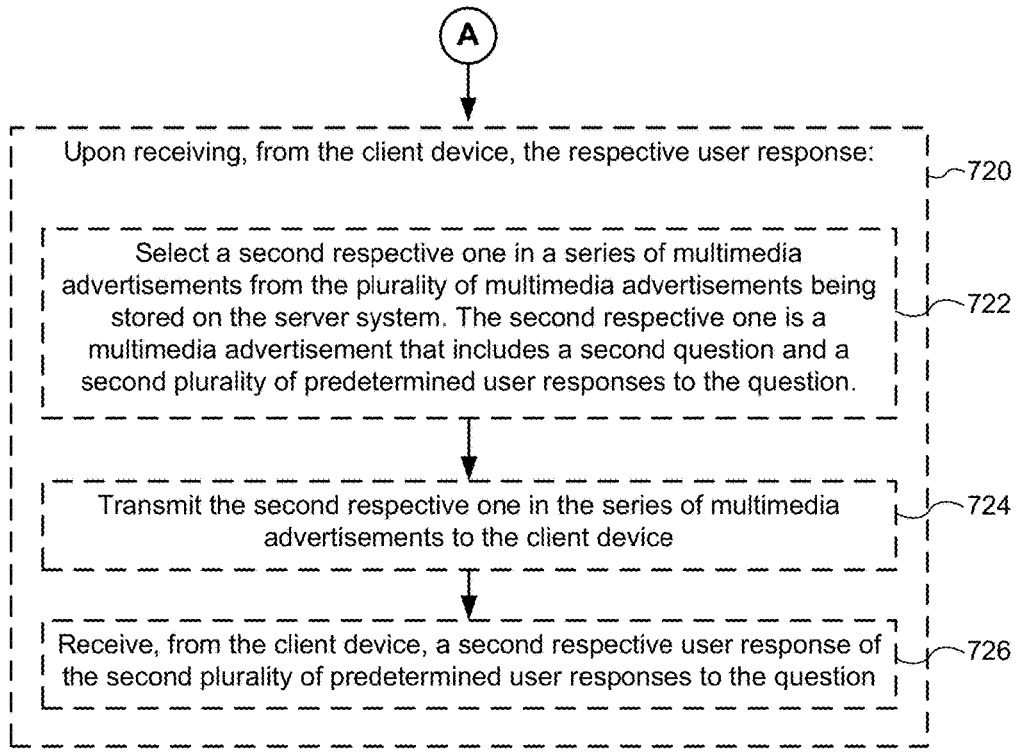
Figure 8A:
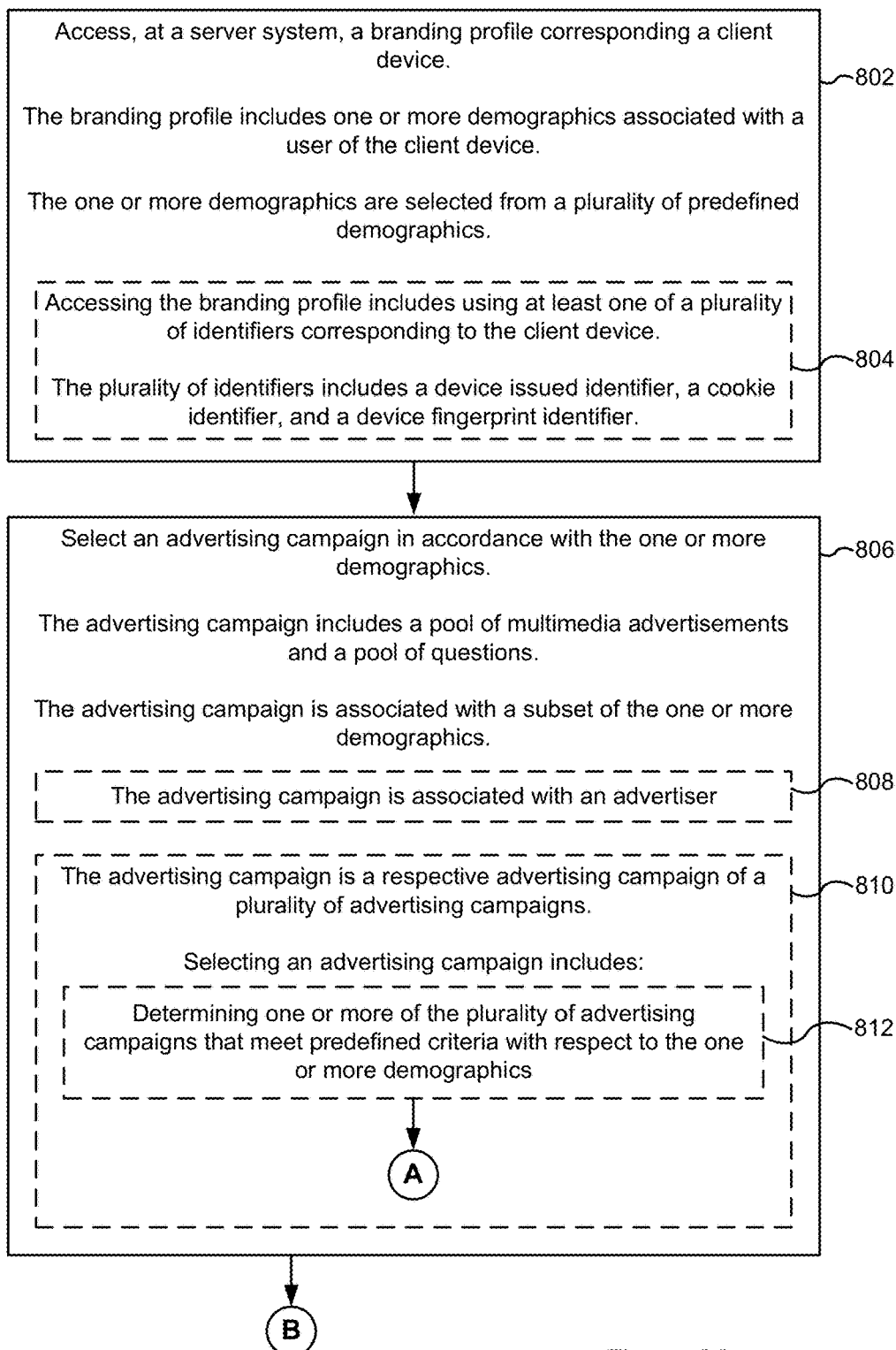
FIGS. 8A-8D are flow diagrams illustrating a method of targeting online advertisements, in accordance with some implementations.
Figure 8B:
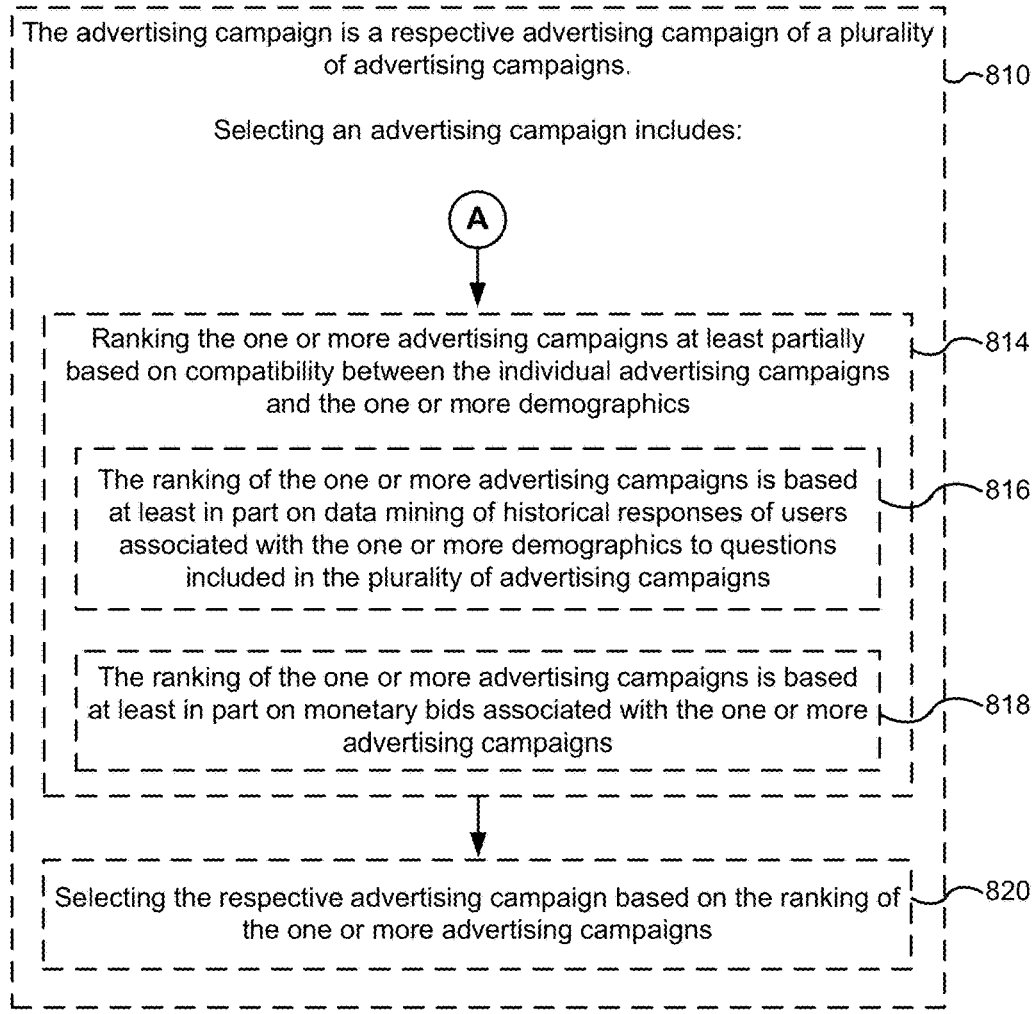
Figure 8C:
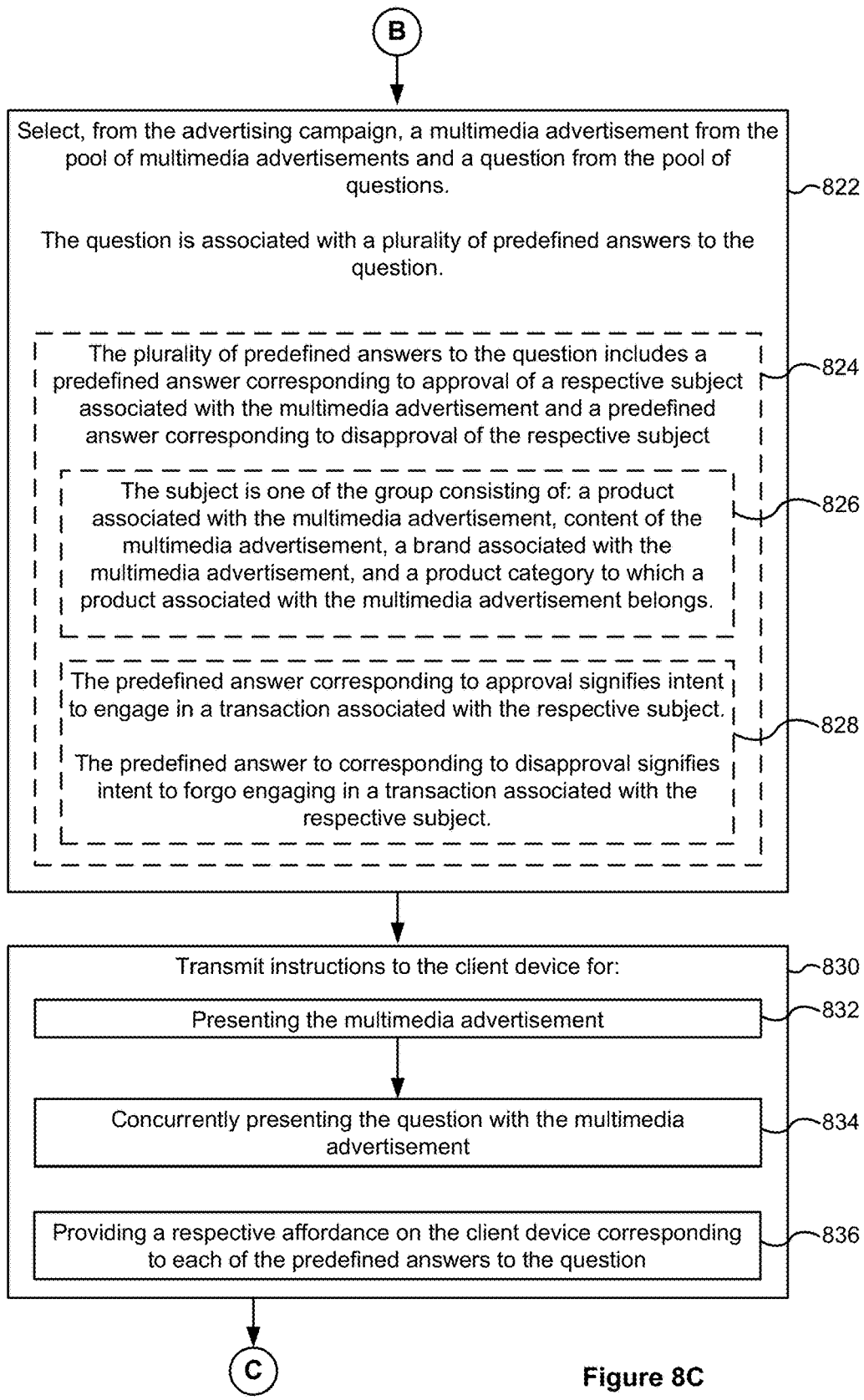
Figure 8D:
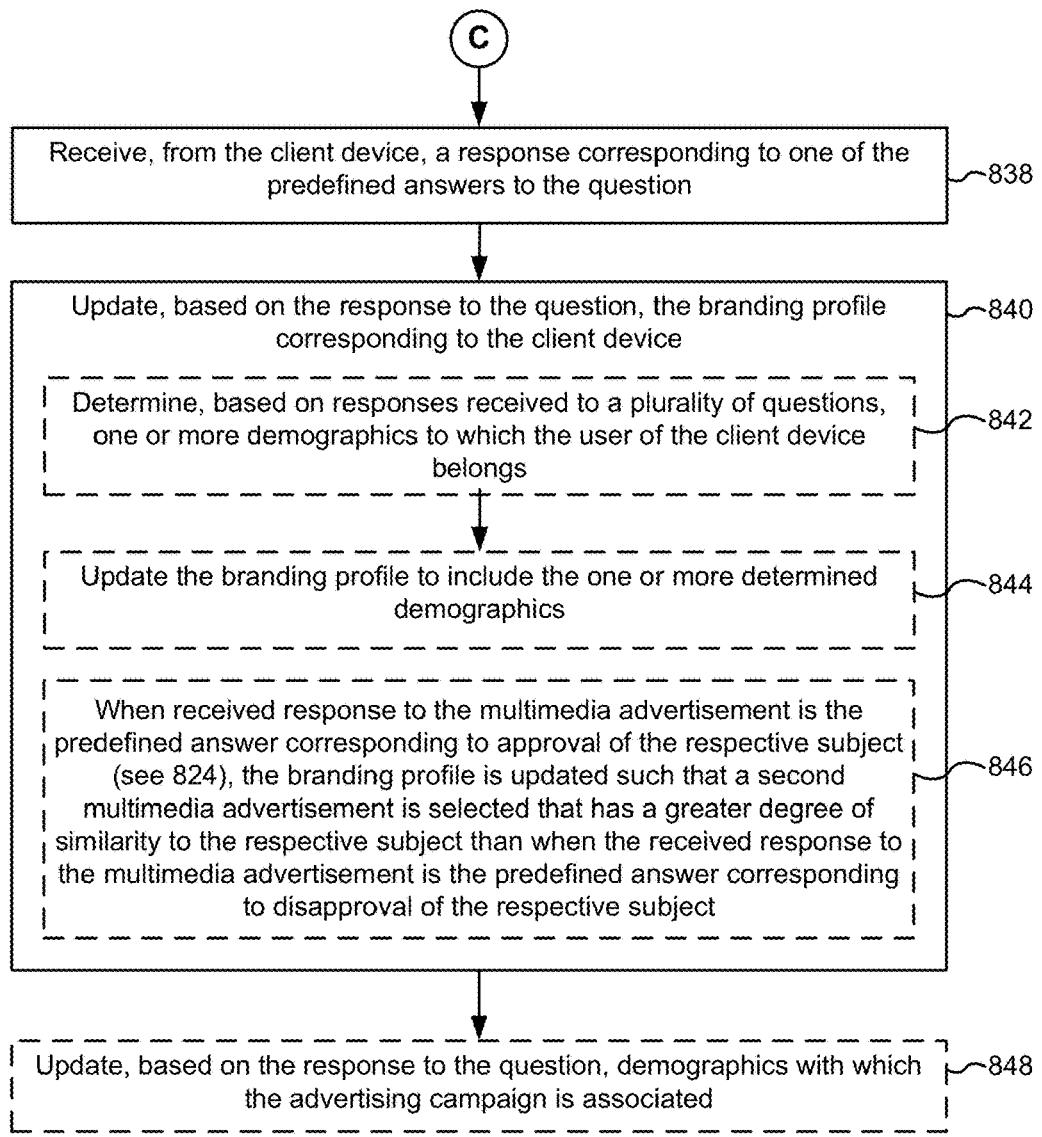

FIGS. 7A-7B are flow diagrams illustrating a method 700 of multimedia advertising, in accordance with some implementations. In particular, the method 700 is a method of serving a "vote to close" multimedia advertisement to a client device, in accordance with some implementations. In some implementations, the method 700 is performed at a server system (e.g., the ad server system 111-*b*, FIG. 1). In some implementations, various operations performed with reference to the method 700 can be distributed across multiple servers or multiple server systems.

In various implementations, some operations of method 700 may be combined and/or the order of some operations may be changed from the order shown in the figures. Also, in some implementations, operations shown in separate figures and/or discussed in association with separate methods (e.g., method 600, FIGS. 6A-6C and/or method 800, FIGS. 8A-8D) may be combined to form other methods, and operations shown in the same figure and/or discussed in association with the same method may be separated into different methods. Moreover, in some implementations, one or more operations in the methods are performed by modules of ad server system 111-*b* shown in FIG. 2, including, for example, CPU(s) 202, memory 206, network interface 208 and/or any sub modules thereof.

The method includes receiving (702), at the server system, an advertisement request for an advertisement to be served to a client device.

The server system selects (704) a respective multimedia advertisement from a plurality of multimedia advertisements being stored on the server system. The respective multimedia advertisement includes a question and a plurality of predetermined user responses to the question. In some implementations, the request includes (706) identifying information formatted in accordance with a respective one of the mobile app and the mobile web browser. In some implementations, the server system uses (708) the identifying information for the selection of the respective multimedia advertisement from the plurality of multimedia advertisements being stored on the server system. For example, in some implementation, the device uses first information obtained from a mobile app the client device for the purposes of fingerprinting said first information to second information obtained from the mobile browser of the client device. Fingerprinting in this manner can improve selection of an advertisement based on demographics (e.g., a demographic profile can be constructed based on information from a user's mobile apps in combination with information obtained from the user's mobile browser) and can also be used to ensure that the user is not asked to vote on the same question twice (e.g., once in a mobile app and once in a web browser).

The server system transmits (710) the respective multimedia advertisement to the client device. The server system receives (712), from the client device, a respective user response of the plurality of predetermined user responses to the question.

In some implementations, the server system stores (714) an aggregated summary of user responses associated with the multimedia advertisement. In some implementations, the server system determines (716) whether the aggregated summary represents a positive aggregate user opinion corresponding to the multimedia advertisement. In some implementations, the server system transmits (718) the information corresponding to the aggregated summary of user responses associated with the multimedia advertisement to the client device (e.g., for display as shown in FIG. 4F). In some implementations, the transmitting operation 718 occurs in accordance with the determination that the aggregated summary represents a positive aggregate user opinion corresponding to the multimedia advertisement, whereas if the server opinion determines that the aggregated summary does not represent a positive opinion corresponding to the multimedia advertisement (e.g., represents a negative opinion) the server system forgoes (e.g., suppresses) transmitting operation 718. In this manner, advertiser's can control the display of information so that the information is displayed only when it paints a positive picture of their products and services.

In some implementations, upon receiving (720), from the client device, the respective user response, the device selects (722) a second respective one in a series of multimedia advertisements from the plurality of multimedia advertisements being stored on the server system. The second respective one is a multimedia advertisement that includes a second question and a second plurality of predetermined user responses to the question. The server system transmits (724) the second respective one in the series of multimedia advertisements to the client device. In some implementations, the server system receives (726), from the client device, a second respective user response of the second plurality of predetermined user responses to the question. In this manner, advertiser's can have users participate quickly and efficiently in branding campaigns (e.g., branding surveys). Such campaigns are more convenient and more likely to be utilized than conventional methods of branding campaigns, such as asking the user to participate in a survey that will require the user to navigate to a third party website.

It should be understood that the particular order in which the operations in FIGS. 7A-7B have been described is merely exemplary and is not intended to indicate that the described order is the only order in which the operations could be performed. One of ordinary skill in the art would recognize various ways to reorder the operations described herein.

FIGS. 8A-8D are flow diagrams illustrating a method 800 of targeting multimedia advertising campaigns, in accordance with some implementations. In particular, the method 800 targets multimedia advertisements based on a user's response to advertising questions (e.g., responses to the "vote to close" multimedia advertisement questions described with reference to the method 600, FIGS. 6A-6C and/or the method 700, FIGS. 7A-7B). In some implementations, the method 800 is performed at a server system (e.g., the ad server system 111-*b*, FIG. 1). In some implementations, various operations performed with reference to the method 800 can be distributed across multiple servers or multiple server systems (e.g., the publisher server system 111-*a*, the content delivery server system 111-*c*, and/or other mediators, advertiser tracking systems, and the like). For ease of explanation, the method 800 is described with reference to a single server system ("the server system").

The server system accesses (802) a branding profile corresponding to a client device. The branding profile includes one or more demographics associated with a user of the client device. The one or more demographics are selected from a plurality of predefined demographics. In some embodiments, the demographics include interest demographics of the user, geographical demographics of the user, age demographics of the user, gender demographics of the user, past purchase demographics of the user, predicted purchase demographics of the user (e.g., "in-market" demographics, indicating that the user is in the market for a product or a category of products), and/or device data demographics of the user. In various circumstances, the user can self-identify as belonging to a demographic (e.g., by filling out a user profile and/or answering "demographic determinative questions," as described below), the demographics can be ascertained (e.g., inferred) using a history of one or more of the user's responses to questions, and/or imported from a third party (e.g., by using an API to access a user's social media profile).

For example, a respective user may be associated with one age demographic determined from his Facebook profile (e.g., a 20-29 year old age range, or alternatively, a specific age, such as 26 years old), three past purchase demographics determined directly from his answers to advertising questions (e.g., the user has identified himself in the answers as a buyer of sports cars, music equipment, and educational material) and one inferred gender demographic (e.g., a male demographic inferred from a history of responses to advertising questions), whereas another user may be associated with several in-market demographics but no other demographics.

Figure 10:
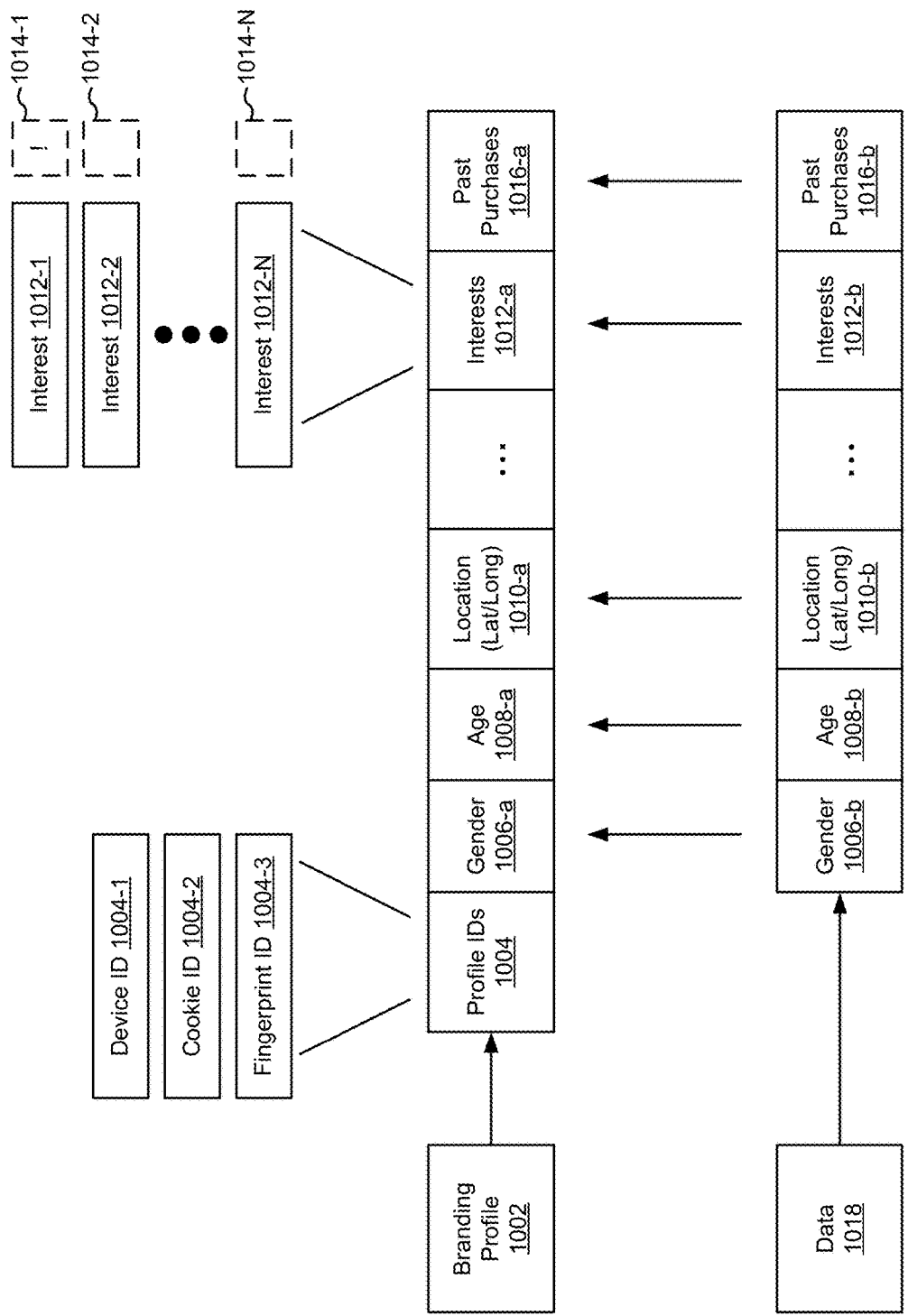
FIG. 10 illustrates a data structure for a branding profile, in accordance with some implementations.

In some embodiments, the demographics are arranged in a hierarchy, meaning that a demographic may have several daughter or parent demographics. For example, an interest demographic for "automobiles" may have daughter demographics for "sports cars"; "minivans"; "trucks"; "motorcycles"; and the like. In some embodiments, if a user is associated with a demographic that has one or more parent demographics, the user is automatically associated with (e.g., will inherit) the one or more parent demographics. Thus, a user who is interested in "sports cars" is also interested in "automobiles." Since the converse is not necessarily true, in some embodiments, a user will not inherit daughter demographics (e.g., a user interested in automobiles is not necessarily interested in minivans). In some embodiments, the server system determines which demographics are inherited and stores the inherited demographics in the branding profile (e.g., as shown in FIG. 10). Alternatively, in some embodiments, the server system stores only the lowest-level demographics in the branding profile. In such circumstances, when the server system selects an advertising campaign (e.g., see operations 806-820), the server system checks a demographic hierarchy on the server system to determine whether any of the user's branding profile demographics have parent demographics that are associated with any potential advertising campaigns. If so, in some embodiments, the user's branding profile is considered associated with those parent demographics for the purposes of assessing the relevance of the advertising campaign to the user (e.g., see operation 812).

In some embodiments, accessing the branding profile includes (804) using at least one of a plurality of identifiers corresponding to the client device. The plurality of identifiers (IDs) includes a device issued identifier (e.g., device ID 1004-1, FIG. 10) and a device fingerprint identifier (e.g., fingerprint ID 1004-3, FIG. 10). The plurality of identifiers also optionally includes a cookie ID (e.g., cookie ID 1004-2, FIG. 10). In some embodiments, the fingerprint identifier is a nearly unique bit string corresponding to the branding profile (e.g., the fingerprint identifier has a high probability of uniquely corresponding to a respective branding profile among all of the branding profiles stored on or accessible to the server system). In some embodiments, the server system generates the device fingerprint identifier by mapping fingerprinting information (e.g., fingerprinting information 902-1, FIG. 9) onto the nearly unique bit string and stores the bit string as the fingerprint identifier. In some embodiments, the fingerprinting information includes a subset of the following (or all of the following): device type information, screen size information, color depth information, an operating system identifier, one or more language identifiers, system font information, browser plug-in information, user agent information, a time zone identifier, and/or an Internet protocol (IP) address.

The server system selects (806) an advertising campaign in accordance with the one or more demographics. The advertising campaign includes a pool of multimedia advertisements and a pool of questions. The advertising campaign is associated with a subset of the one or more demographics. In some embodiments, the advertising campaign is associated with an advertising campaign profile stored on the server system. The advertising campaign profile includes information indicating which demographics the advertising campaign is targeting (herein referred to as "targeted demographics"). For example, as described in more detail with reference to FIG. 11, an advertising campaign may target men (i.e., a gender demographic), between the ages of 25-44 years old (i.e., an age range demographic), in several different zip codes (i.e., a geographical demographic).

In some embodiments, the advertising campaign is associated with an advertiser. For example, an automobile manufacture may have produced a series of advertisements (e.g., a plurality of advertisements) for a line of pick-up trucks manufactured and sold by the automobile manufacture. In such circumstances, the advertising campaign may include (e.g., consist of) the series of advertisements.

Alternatively, the advertising campaign may not be associated with a particular advertiser, and may instead be associated with a particular interest (e.g., an interest demographic). Thus, such an advertising campaign may be a "pick-up truck" advertising campaign that includes advertisements from a plurality of automobile manufacturers. Each multimedia advertisement in the advertising campaign will promote the corresponding manufacture's pick-up truck. In some circumstances, such an advertising campaign can be created and maintained by a company that maintains the server system in order to provide its advertisement hosts (e.g., content publishers, such as web pages or mobile app producers) with advertisements that are relevant to their audience. Since no publisher wishes to annoy its customers with irrelevant advertisements, constructing an advertising campaign in this manner serves to assuage the publishers' concerns about alienating their viewership, readership, or the like. In turn, the publishers will be more amenable to hosting advertisements.

In some embodiments, the advertising campaign is (810) a respective advertising campaign of a plurality of advertising campaigns. Selecting an advertising campaign includes determining (812) one or more of the plurality of advertising campaigns that meet predefined criteria with respect to the one or more demographics. For example, in some embodiments, determining if a respective advertising campaign meets the predefined criteria includes determining if a threshold number of target demographics match the one or more demographics in the branding profile (e.g., at least three of the target demographics must match the branding profile). Such demographics are referred to herein as "matching demographics." In other words, in some embodiments, the predefined criteria are met when the number of matching demographics is greater than or equal to the threshold number of target demographics.

In some embodiments, a mapping is performed in order to determine whether a target demographic matches a branding profile demographic (and is therefore a matching demographic). For example, the branding profile may include geographical coordinates expressed in latitude and longitude (e.g., obtained through a global positioning system (GPS) on the client device). The advertising campaign, however, may target specific zip codes (e.g., because the advertising campaign is for a retailer that has locations in the targeted zip codes). In some circumstances, the server system maps the latitude and longitude coordinates to a respective zip code and determines whether the zip code matches a targeted zip code. Similarly, the branding profile may include an age of the user (e.g., 25 years old) while an advertising campaign targets consumers within an age range (e.g., 20-35 years old). Thus, in some circumstances, the server system maps an age to a respective targeted age range and determines whether the user's age matches the age range.

In some embodiments, the target demographics include required demographics. The predefined criteria with respect to the one or more demographics include that the branding profile match all of the required demographics. For example, an advertising campaign for a women's deodorant may require that the user is a woman (according to her branding profile).

In some embodiments, the target demographics include "reject" demographics. For example, an advertising campaign for women's deodorant may choose to "reject" men, rather than require that the user be a woman, because the advertising campaign is interested in targeting both known women and user's whose gender is not known (e.g., the user's branding profile includes a "null" gender demographic). In some embodiments, the reject demographics are required reject demographics, meaning if a user's branding profile indicates that the user belongs to any of an advertising campaign's required reject demographics, the server system is prevented from serving (e.g., providing) advertisements from the advertising campaign to the user. Alternatively, in some embodiments, the reject demographics count against other predefined criteria. For example, if an advertising campaign requires at least three matching demographics, in some embodiments, a matching reject demographic reduces the number of matching demographics by one (e.g., it serves as a "negative" match).

In some embodiments, the target demographics are automatically generated based at least in part on data mining of historical responses of users. In some embodiments, the server system indexes and stores historical responses to questions as well as demographic information about the users who gave those responses. The server system mines the historical responses to the questions and the demographic information to discover trends. For example, an advertising campaign promoting a line of pick-up trucks will include the question, "Are you in the market for a pick-up truck?" If the server system determines, based on mining the user responses to this question, that a significantly higher fraction of males between the ages of 20-35 years old have answered "Yes" to this question (e.g., using any known statistical test, such a p-value test, to determine significance), the server system will associate a male demographic and a 20-25 year old age range demographic with the advertising campaign as a "target demographics" (e.g., by storing information identifying those demographics in the advertising campaign's profile).

In some embodiments, selecting an advertising campaign further includes ranking (814) the one or more advertising campaigns at least partially based on compatibility between the individual advertising campaigns and the one or more demographics of the branding profile. In some embodiments, the server system calculates a score (e.g., a metric) for each of the one or more advertising campaigns and ranks the one or more advertising campaigns based on the score. In some embodiments, the ranking of the one or more advertising campaigns is (816) based at least in part on data mining of historical responses of users associated with the one or more demographics to questions included in the plurality of advertising campaigns. For example, in some embodiments, the score/metric S is calculating using the equation:

$$S = -\sum_i \log(p_i) \qquad (1)$$

in which the sum runs over all matching demographics and $p_i$ is a p-value that indicates a level of presumption, based on data mining of historical data, against a neutral hypothesis for a respective matching demographic. The neutral hypothesis represents a hypothesis that members of the respective matching demographic respond to one or more questions associated with an advertising campaign in the same statistical way that a general population responds to the one or more questions associated with the advertising campaign.

In some embodiments, the advertising campaign with the highest score S is selected and a multimedia advertisement from the selected advertising campaign is served to the user. Thus, in some embodiments (based on Eq. (1) above), an advertising campaign with more matching demographics has a selection advantage because the sum will extend over a larger number of demographics, as compared to an advertising campaign with fewer matching demographics. But this advantage can be overcome, in some circumstances, by an advertising campaign that matches extremely well to the branding profile (e.g., the matching demographics have very low p-values, indicating a strong presumption against a neutral hypothesis).

Figure 11:
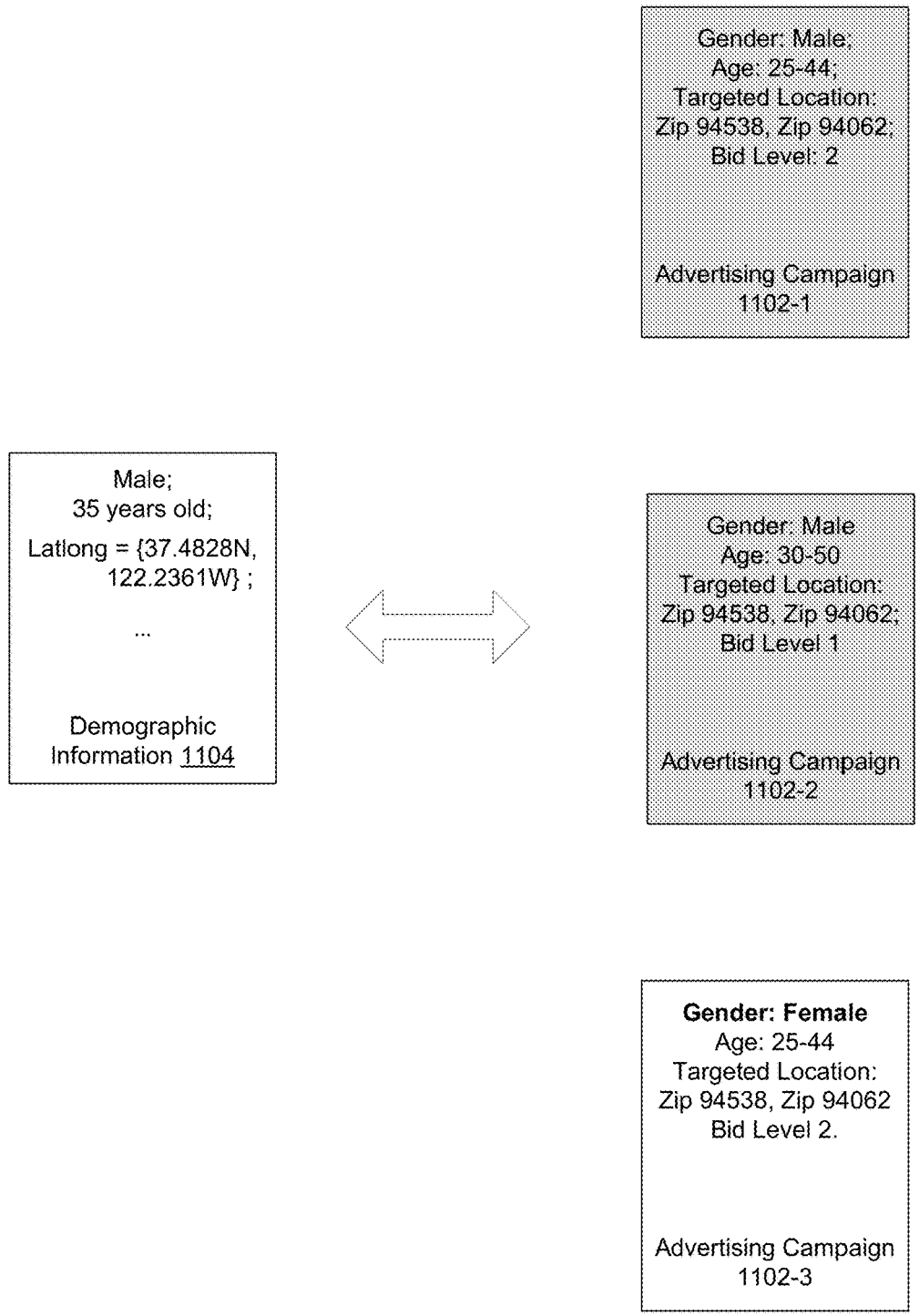
FIG. 11 illustrates selection of an advertising campaign based on demographic information associated with the branding profile data structure, in accordance with some implementations.

In some embodiments, the ranking of the one or more advertising campaigns is (818) based at least in part on monetary bids associated with the one or more advertising campaigns. For example, as shown in FIG. 11, in some embodiments, various advertising campaigns can be associated with different bid levels. A first advertiser may pay a first price for a bid level of "1," whereas a second advertiser may pay a second, higher, price for a bid level of "2." In such embodiments, the server system will use a leveling scheme to provide proportionally more advertisements from the second advertiser (e.g., in accordance with the contractual terms between the first advertiser, second advertiser, and the company managing the server system).

In any event, the server system selects (820) the respective advertising campaign based on the ranking of the one or more advertising campaigns.

The server system then selects (822), from the respective advertising campaign, a multimedia advertisement from the pool of multimedia advertisements and a question from the pool of questions (e.g., to be served, or provided, to the user). In some embodiments, the question is associated with a particular multimedia advertisement (e.g., in a one-to-one fashion), such that selection of a respective multimedia advertisement also fully determines selection of the associated question.

The question is associated with a plurality of predefined answers to the question. In some embodiments, the plurality of predefined answers to the question includes a predefined answer corresponding to approval of a respective subject associated with the multimedia advertisement and a predefined answer corresponding to disapproval of the respective subject. In various embodiments, the subject is (826) one of the group consisting of:

a product associated with the multimedia advertisement (e.g., the question is "Do you like this product?" and the predefined answers include "Yes" and "No");

content of the multimedia advertisement (e.g., the question is "How do you feel about this commercial?" and the predefined answers include "Like" and "Dislike");

a brand associated with the multimedia advertisement (e.g., the question is "Rate this brand" and the predefined answers include "1"; "2"; "3"; "4"; and "5"); and a product category that a product associated with the multimedia advertisement belongs to (e.g., the question is "Are you interested in the market for a new car?" and the predefined answers include "Yes" and "No").

In some embodiments, the predefined answer corresponding to approval signifies intent to engage in a transaction associated with the respective subject of the multimedia advertisement. Conversely, the predefined answer corresponding to disapproval signifies intent to forgo engaging in a transaction associated with the respective subject of the multimedia advertisement. For example, as shown in FIG. 4A, the question ("Want to see?") asks whether the user intends on seeing the movie (i.e., the subject) that full-page multimedia advertisement 402 is promoting. As shown in FIG. 4B, the question is associated with a plurality of predefined answers, namely: an answer "Yes" corresponding to approval of the respective subject (the movie), and an answer "No" corresponding to disapproval of the respective subject. Thus, interest in seeing the movie, or more generally, engaging in a transaction associated with the multimedia advertisement is considered approval, while intent to forgo a transaction is considered disapproval.

The server system transmits (830) instructions to the client device for presenting (832) the multimedia advertisement and concurrently presenting (834) the question with the multimedia advertisement. As used herein, the term concurrently presenting should be construed to mean that there is at least some overlap in time when the multimedia advertisement and the question are presented. The multimedia advertisement and question need not be presented for identical concurrent periods of time, although they can be.

In some embodiments, sending instructions to the client device for presenting the multimedia advertisement includes sending advertisement information (e.g., including a universal resource locator (URL) and an advertisement identifier) to the client device. The client device uses the advertisement information to retrieve the content of the multimedia advertisement from a different server system (e.g., the client device retrieves a file, such as a JavaScript (JS) file from the content delivery server system 111-c, FIG. 1). In some embodiments, the advertisement information includes instructions for the client device to perform other tasks, such as contact an advertiser's tracking system (e.g., an advertiser's impression tracker) to record an impression.

The server system also transmits instructions to the client device for providing (836) a respective affordance on the client device corresponding to each of the predefined answers to the question (e.g., any of the buttons, swipe affordances, and/or other affordances shown in FIGS. 4A-4G and/or FIGS. 5A-5D). In some embodiments, the instructions for providing a respective affordance corresponding to each of the predefined answers to the question include text associated with each of the predefined answers to the question (e.g., text that poses the question, such as "Do you want to buy this product?").

The server system receives (838), from the client device, a response corresponding to one of the predefined answers to the question. In some circumstances, the received response is considered an "impression" (e.g., the received response is received by a the server system's impression tracker, such as impression tracking sub-module 213, FIG. 2). The server system updates (840), based on the response to the question, the branding profile corresponding to the client device.

For example, in some circumstances, the questions include "demographic determinative" questions, such as "Are you in the market for a car?" When the received response indicates that the user is in the market for a car, the branding profile is updated with a "predicted purchase→car" demographic. Conversely, in some embodiments, when the received response indicates that the user is not in the market for a car, the branding profile is updated with the "predicted purchase→car" demographic and a "NOT" identifier (e.g., NOT tags 1014, FIG. 10) that logically negates the "predicted purchase→car" demographic (i.e., signifying that the user is not in the market for a car).

Alternatively, rather than updating the branding profile based on a single demographic determinative question, in some embodiments, the server system determines (842), based on responses received to a plurality of questions, one or more demographics that the user belongs to and updates (844) the user's branding profile to include those determined demographics. For example, the server system may receive responses to a plurality of questions from a user with an unknown gender. In some embodiments, the server system will compare the user's responses with historical responses to the same questions from a cohort of user's having known genders (e.g., the gender for the cohort of users may be known from 3rd party data, e.g., via an API for a 3rd party social media website). The system may then determine (e.g., based on a statistical algorithm) that there is a strong likelihood (e.g., greater than 95%) that the user is male based on his responses to the plurality of questions and will update the user's branding profile to include a male demographic.

In some embodiments, when the received response to the multimedia advertisement is (846) the predefined answer corresponding to approval of the respective subject (see 824), the branding profile is updated such that a second multimedia advertisement is selected that has a greater degree of similarity to the respective subject than when the received response to the multimedia advertisement is the predefined answer corresponding to disapproval of the respective subject. For example, the question "Are you in the market for a car?" may be the associated with a car dealer's advertising campaign. If the response indicates that the user is in the market for a car, the server system may continue to provide multimedia advertisements from the car dealer's advertising campaign. Conversely, if the response indicates that the user is not in the market for a car, the server system may select a different advertising campaign to select the second multimedia advertisement from (e.g., because the "predicted purchase→car" is a required demographic for the car dealer's advertising campaign). In this sense, the targeted advertising methods described herein dynamically adjust to information known about the user.

In some embodiments, the server system updates (848), based on the response to the question, demographics that the advertising campaign is associated with. For example, the server system will index and store the user's response to the question (e.g., in historical data 220, FIG. 2) and use the response for future data mining, as described with above, to determine demographics that are amenable to the advertising campaign.

Figure 9:
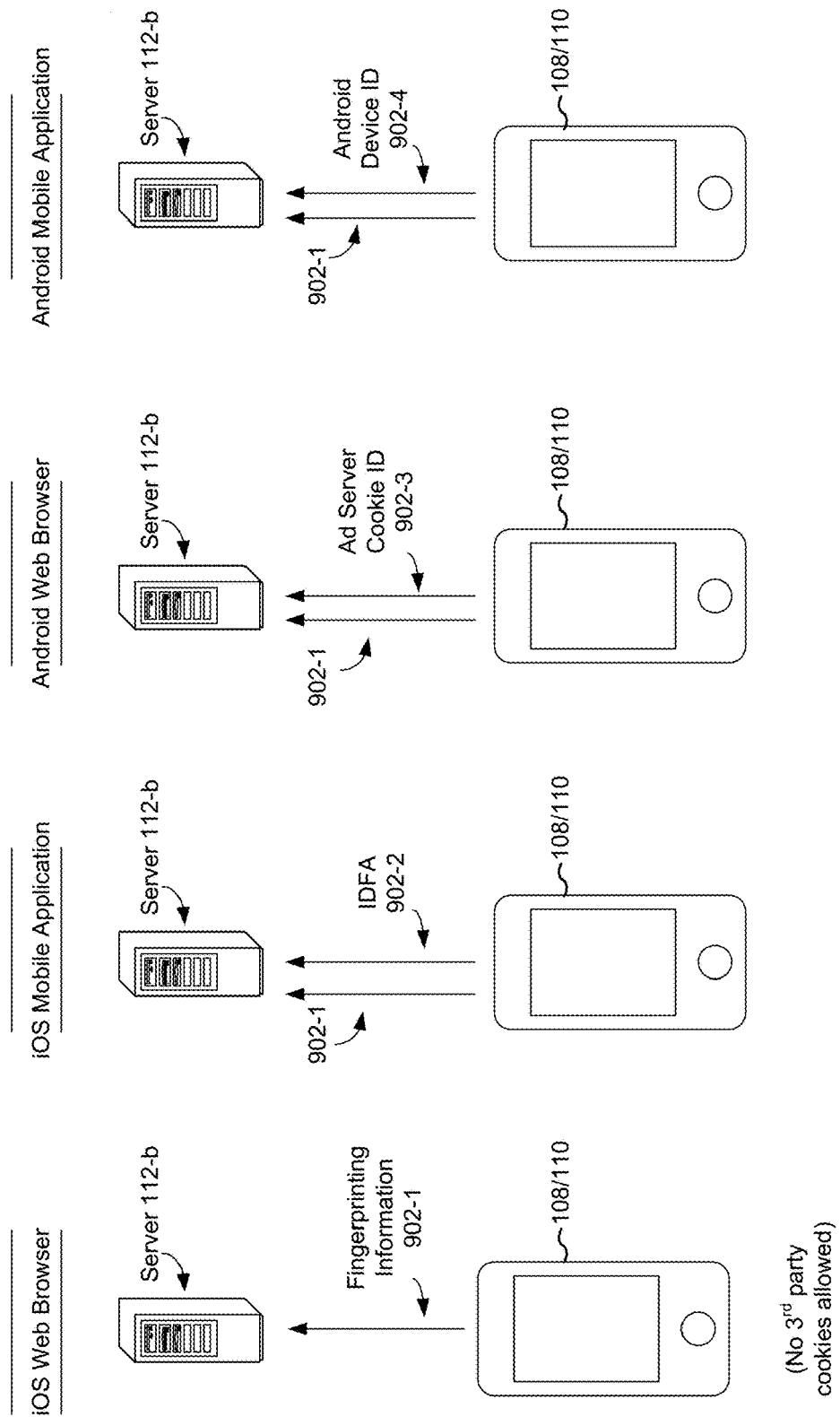
FIG. 9 illustrates examples of client identifying information received by an advertisement server system, in accordance with some implementations.

FIG. 9 illustrates examples of various types of identifying information 902 that can be used to identify a single client device 108/110, in accordance with some implementations. A single client device may request advertisements from a plurality of platforms running on the client device. For example, an iOS device may request ads from its mobile web browser and also request ads from its various mobile applications. Similarly, an Android device may request ads from its mobile web browser and also request ads from its various mobile applications. In some circumstances, different identifying information is available from the different platforms. Despite these differences, the user of the client device is likely to be the same user regardless of whether he or she is using a mobile application or a web browser. The gender, age, interests, and other demographics of the user are unlikely to change depending on whether the request is coming from a mobile application or a web browser. To this end, in some embodiments, the ad server system 111-*b* uses fingerprint information 902-1 to map identifying information received from different platforms onto a single unique identifier for the client device. This allows the client device to have a single corresponding branding profile.

As a specific example, the current iOS web browser does not allow advertisers to install 3rd party cookies (at least without the user taking additional action, such as clicking on a link for an advertisement). However, certain types of fingerprinting information 902-1 are available to the ad server system 111-*b*. In various circumstances, the fingerprinting information 902-1 includes: device type information, screen size information, color depth information, an operating system identifier, one or more language identifiers, system font information, browser plug-in information, user agent information, a time zone identifier, and/or an Internet protocol (IP) address, or a combination thereof. In some embodiments, when an ad request is received from an iOS web browser, the ad server system 111-*b* receives the fingerprinting information 902-1 and maps it onto a nearly unique fingerprint identifier (ID). On the other hand, when a mobile application running on an iOS device sends an ad request, in some embodiments, the ad server system 111-*b* receives an identifier for advertisers (IDFA) 902-2, which is a device issued identifier, and also receives the fingerprinting information 902-1. As long as the fingerprinting information 902-1 has not changed, the ad server system 111-*b* maps the fingerprinting information 902-1 to the same nearly unique fingerprint ID and associates the nearly unique fingerprint ID with the IDFA 902-2 such that, when a subsequent ad request is received, the same branding profile is accessed regardless of whether the ad server system 111-*b* receives the fingerprint information 902-1 or the IDFA 902-2. The IDFA 902-2 can then be used to update the mapping to the fingerprint ID whenever the fingerprinting information 902-1 does change (e.g., because an Internet provider changed the devices IP address).

As another specific example, unlike the current iOS web browser, Android's current web browser does allow advertisers to install 3rd party cookies. Thus, in the case of an ad request from an Android web browser, in some embodiments, the ad server system 111-*b* receives an ad server cookie ID 902-3 and also receives the fingerprinting information 902-1. When the request comes from a mobile application running on an Android device, the ad server system 111-*b* receives an Android device ID 902-4, which is a device issued ID, and also receives the fingerprinting information 902-1. In an analogous manner, in some embodiments, the fingerprinting information 902-1 is mapped to a nearly unique fingerprint ID, which is then used to map the Android device ID 902-3 to the ad server cookie ID 902-4, so that they both access the same branding profile.

FIG. 10 illustrates a data structure for a branding profile 1002 corresponding to a client device, in accordance with some implementations. The branding profile 1002 is accessible using a plurality of profile identifiers (IDs) 1004 corresponding to the client device, including: a device ID 1004-1 (e.g., a device issued ID such as IDFA 902-2 or Android device ID 902-4, FIG. 9); a cookie ID 1004-2 (e.g., ad server cookie ID 902-3, FIG. 9); and a fingerprint ID 1004-3 (e.g., an ID generated using fingerprinting information 902-1, FIG. 9).

The branding profile 1002 also stores a plurality of demographics, including:

- A gender demographic 1006 (e.g., the value 1006-*a* of which can be male, female, or NULL if the user's gender is not known).
- An age demographic 1008 (e.g., the value 1008-*a* of which can be a specific age in years, a predefined age range, or NULL if the user's age is unknown).
- A location demographic 1010 (e.g., the value 1010-*a* of which can be expressed as latitude and longitude coordinates, or NULL if the user's coordinates are unknown).
- One or more interest demographics 1012 (e.g., which can include multiple values 1012-*a* such as a first interest 1012-1 representing cars, a second interest 1012-2 representing fishing, and so on, up to an Nth interest 1012-N). The one or more interest demographics 1012 also optionally include a field for a NOT tag 1014 that indicates that the user is known to be not interested in a certain subject (such as cars). For example, NOT tag 1014-1 is flagged, indicating that the user is not interested in interest 1012-1, while NOT tags 1014-2 and 1014-N are empty, indicating that the user is interested in interests 1012-2 and 1012-N.
- One or more past purchase demographics 1016, (e.g., which can include multiple values 1016-*a* and have an analogous structure to the one or more interest demographics and thus are not shown in detail).

In some circumstances, the ad server system 111-*b* can retrieve data 1118 about the user from whom a respective branding profile belong (e.g., through an API provided by a social media website or through data mining as described with reference operations 842-844 (FIGS. 8A-8D)). In some embodiments, the data 1118 is used to update the branding profile 1002.

In some embodiments, the ad server system 111-*b* manages conflicts between the branding profile 1002 and the incoming data 1118. For example, if data 1118 includes a gender value 1006-*b* that indicates a male user, and the branding profile's gender value 1006-*a* indicates a female user, in some embodiments, the ad server system 111-*b* will determine which of the two values is more reliable based on predefined criteria. In some embodiments, the ad server system 111-*b* will overwrite the gender value 1006-*a* if the gender value 1006-*b* is obtained directly from the user's social media (e.g., is obtained via an API), but not if the gender value 1006-*b* is obtained through data mining (which is presumed to be less reliable). In some embodiments, the ad server system 111-*b* will always overwrite NULL values for the gender.

In a similar manner, the ad server system 111-*b* will manage conflicts between an age value 1008-*a* of the branding profile and an age value 1008-*b* of the data 1118, and a location value 1010-*a* of the branding profile and a location value 1010-*b* of the data 1118. In some embodiments, the ad server system 111-*b* will add interests 1012-*b* of the data 1118 to interests 1012-*a* of the branding profile, unless a conflict exists in the NOT tags 1014, in which case the ad server system 111-*b* will manage the conflicts accordingly. Likewise, the ad server system 111-*b* will add past purchases 1016-*b* from the data 1118 to the past purchases 1016-*a* of the branding profile.

In some embodiments (not shown), the branding profile 1002 includes a listing of advertisements already served to the user (e.g., so that the same advertisement is not served twice).

FIG. 11 illustrates selection of an advertising campaign 1102-1 from a plurality of advertising campaigns 1102 based on demographic information 1104 associated with a branding profile (e.g., branding profile 1002, FIG. 10), in accordance with some implementations. The demographic information 1104 includes demographics of the branding profile, e.g., the user's gender, age, geographical location (expressed in latitude and longitude, or "latlong," coordinates). The ad server system 111-b determines one or more of the plurality of advertising campaigns 1102 that meet predefined criteria with respect to the one or more demographics. For example, in the example shown in FIG. 11, the ad server system 111-b determines that advertising campaigns 1102-1 and 1102-2 meet the predefined criteria because they include at least three matching demographics and do not include any required demographics. In some embodiments, the ad server system maps demographic information 1104 onto the advertising campaign's demographics to determine if that match (e.g., the user's latlong coordinates are mapped to target zip codes, and the user's age is mapped to target age ranges). The ad server system 111-b determines that advertising campaign 1102-3 is not suitable for the user because the advertising campaign 1102-3 includes a required female demographic, while the demographic information 1104 indicates that the user is male.

The ad server system 111-b then selects advertising campaign 1102-1 instead of advertising campaign 1102-2, for example, by ranking the two advertising campaigns based on their bid level and selecting the advertising campaign with the highest bid level.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles of the disclosure and its practical applications, to thereby enable others skilled in the art to best utilize the various implementations with various modifications as are suited to the particular use contemplated.

It will be understood that, although the terms "first," "second," etc. are sometimes used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the "first element" are renamed consistently and all occurrences of the second element are renamed consistently. The first element and the second element are both elements, but they are not the same element.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

Throughout the preceding description, various implementations are described within the context of smart phone cameras, tablets and the like. This is purely for convenience of explanation and is not intended to limit the claims that follow.

What is claimed is:

1. A computer implemented method, comprising:
   at a server system having memory and one or more processors:
      receiving a request to load a first web page, the request including a client device identifier;
         in response to receiving the request to load the first web page, identifying a user profile associated with a client device using the client device identifier, without user interaction;
      obtaining the user profile corresponding to the client device, the user profile including one or more demographics associated with a user of the client device, wherein the one or more demographics are selected from a plurality of predefined demographics;
      selecting an interactive media campaign in accordance with the one or more demographics, the interactive media campaign including a plurality of multimedia content items and a plurality of questions, wherein the interactive media campaign is associated with a subset of the one or more demographics;
      selecting, from the interactive media campaign, a multimedia content item from the plurality of multimedia content items and a question from the plurality of questions, wherein the question is associated with a plurality of predefined answers to the question;
      transmitting, to the client device:
         instructions that cause the multimedia content item to be presented by the client device;
         instructions that cause the question to be presented by the client device concurrently with the multimedia content item; and
         instructions that cause a plurality of respective affordances to be presented on the client device, each respective affordance of the plurality of respective affordances corresponding to a respective answer the predefined answers to the question;
   at the client device:
      receiving, from the server system, and processing:
         the instructions that cause the multimedia content item to be presented by the client device;
         the instructions that cause the question to be presented by the client device concurrently with the multimedia content item; and
         the instructions that cause the plurality of affordances to be presented on the client device;
      initiating concurrent display of the multimedia content item including the question;
      upon a lapse of a first predetermined amount of time following initiating display of the multimedia content item, displaying the plurality of respective affordances on the display, wherein selection of one of the plurality of respective affordances corresponds to selection of a predefined answer to the question and causes the electronic device to discontinue display of the multimedia content item and transmit a response corresponding to the selected predefined answer to the server system;
upon a lapse of a second predetermined amount of time following initiating display of the multimedia content item, displaying a multimedia-skip affordance, wherein:
the second predetermined amount of time is longer than the first predetermined amount of time; and
selection of the multimedia-skip affordance causes the electronic device to discontinue display of the multimedia content item without receiving selection of a respective user response to the question;
detecting a user input that selects one of the multimedia-skip affordance or a respective affordance of the plurality of affordances; and
upon detection of the user input, discontinuing display of the multimedia content item;
at the server system:
after selection of one of the plurality of respective affordances, receiving, from the client device, the response corresponding to one of the predefined answers to the question; and
updating, based on the response to the question, the user profile corresponding to the client device.

2. The method of claim 1, further including updating, based on the response to the question, demographics with which the interactive media campaign is associated.

3. The method of claim 1, wherein the interactive media campaign is associated with an advertiser.

4. The method of claim 1, wherein the interactive media campaign is a respective interactive media campaign of a plurality of interactive media campaigns, each interactive media campaign of the plurality of interactive media campaigns including a respective plurality of multimedia content items and a respective plurality of questions; and
selecting an interactive media campaign includes:
determining one or more of the plurality of interactive media campaigns that meet predefined criteria with respect to the one or more demographics;
ranking the one or more interactive media campaigns at least partially based on compatibility between the individual interactive media campaigns and the one or more demographics; and
selecting the respective interactive media campaign based on the ranking of the one or more interactive media campaigns.

5. The method of claim 4, wherein the ranking of the one or more interactive media campaigns is based at least in part on data mining of historical responses of users associated with the one or more demographics to questions included in the plurality of interactive media campaigns.

6. The method of claim 4, wherein the ranking of the one or more interactive media campaigns is based at least in part on monetary bids associated with the one or more interactive media campaigns.

7. The method of claim 1, wherein obtaining the user profile includes using at least one of a plurality of identifiers corresponding to the client device, the plurality of identifiers including a device issued identifier, a cookie identifier, and a device fingerprint identifier.

8. The method of claim 1, wherein the plurality of predefined answers to the question includes a predefined answer corresponding to approval of a respective subject associated with the multimedia content item and a predefined answer corresponding to disapproval of the respective subject.

9. The method of claim 8, wherein the subject is one of the group consisting of: a product associated with the multimedia content item, content of the multimedia content item, a brand associated with the multimedia content item, and a product category to which a product associated with the multimedia content item belongs.

10. The method of claim 8, wherein:
the predefined answer corresponding to approval signifies intent to engage in a transaction associated with the respective subject; and
the predefined answer corresponding to disapproval signifies intent to forgo engaging in a transaction associated with the respective subject.

11. The method of claim 8, wherein, when the received response to the multimedia content item is the predefined answer corresponding to approval of the respective subject, the user profile is updated such that a second multimedia content item is selected that has a greater degree of similarity to the respective subject than when the received response to the multimedia content item is the predefined answer corresponding to disapproval of the respective subject.

12. The method of claim 1, further including:
determining, based on responses received to a plurality of questions, one or more demographics to which the user of the client device belongs; and
updating the user profile to include the one or more determined demographics.

13. A server system comprising one or more processors and memory, the memory storing instructions that, when executed by the one or more processors, cause the server system to:
at the server system:
receive a request to load a first web page, the request including a client device identifier;
in response to receiving the request to load the first web page, identify a user profile associated with a client device using the client device identifier, without user interaction;
obtain the user profile corresponding to the client device, the user profile including one or more demographics associated with a user of the client device, wherein the one or more demographics are selected from a plurality of predefined demographics;
select an interactive media campaign in accordance with the one or more demographics, the interactive media campaign including a plurality of multimedia content items and a plurality of questions, wherein the interactive media campaign is associated with a subset of the one or more demographics;
select, from the interactive media campaign, a multimedia content item from the plurality of multimedia content items and a question from the plurality of questions, wherein the question is associated with a plurality of predefined answers to the question;
transmit, to the client device:
instructions that cause the multimedia content item to be presented by the client device;
instructions that cause the question to be presented by the client device concurrently with the multimedia content item; and
instructions that cause a plurality of respective affordances to be presented on the client device, each respective affordance of the plurality of respective affordances corresponding to a respective answer of the predefined answers to the question;
at the client device:
receive, from the server system, and process:
the instructions that cause the multimedia content item to be presented;
the instructions that cause the question to be presented by the client device concurrently with the multimedia content item; and
the instructions that cause the plurality of affordances to be presented on the client device;
initiate concurrent display of the multimedia content item including the question;
upon a lapse of a first predetermined amount of time following initiating display of the multimedia content item, display the plurality of respective affordances on the display, wherein selection of one of the plurality of respective affordances corresponds to selection of a predefined answer to the question and causes the electronic device to discontinue display of the multimedia content item and transmit a response corresponding to the selected predefined answer to the server system;
upon a lapse of a second predetermined amount of time following initiating display of the multimedia content item, display a multimedia-skip affordance, wherein:
the second predetermined amount of time is longer than the first predetermined amount of time; and
selection of the multimedia-skip affordance causes the client device to discontinue display of the multimedia content item without receiving selection of a respective user response to the question;
detect a user input that selects one of the multimedia-skip affordance or a respective affordance of the plurality of affordances; and
upon detection of the user input, discontinue display of the multimedia content item;
at the server system:
after selection of one of the plurality of respective affordances, receive, from the client device, the response corresponding to one of the predefined answers to the question; and
update, based on the response to the question, the user profile corresponding to the client device.

14. The server system of claim 13, wherein the instructions further cause the server system to update, based on the response to the question, demographics with which the interactive media campaign is associated.

15. The server system of claim 13, wherein the interactive media campaign is associated with an advertiser.

16. The server system of claim 13, wherein the interactive media campaign is a respective interactive media campaign of a plurality of interactive media campaigns, each interactive media campaign of the plurality of interactive media campaigns including a respective plurality of multimedia content items and a respective plurality of questions; and
selecting an interactive media campaign includes:
determining one or more of the plurality of interactive media campaigns that meet predefined criteria with respect to the one or more demographics;
ranking the one or more interactive media campaigns at least partially based on compatibility between the individual interactive media campaigns and the one or more demographics; and
selecting the respective interactive media campaign based on the ranking of the one or more interactive media campaigns.

17. The server system of claim 16, wherein the ranking of the one or more interactive media campaigns is based at least in part on data mining of historical responses of users associated with the one or more demographics to questions included in the plurality of interactive media campaigns.

18. The server system of claim 16, wherein the ranking of the one or more interactive media campaigns is based at least in part on monetary bids associated with the one or more interactive media campaigns.

19. The server system of claim 13, wherein obtaining the user profile includes using at least one of a plurality of identifiers corresponding to the client device, the plurality of identifiers including a device issued identifier, a cookie identifier, and a device fingerprint identifier.

20. A non-transitory computer readable storage medium storing one or more programs, the one or more programs comprising instructions that, when executed by a server system cause the server system to:
at the server system:
receive a request to load a first web page, the request including a client device identifier;
in response to receiving the request to load the first web page, identify a user profile associated with a client device using the client device identifier, without user interaction;
obtain the user profile corresponding to the client device, the user profile including one or more demographics associated with a user of the client device, wherein the one or more demographics are selected from a plurality of predefined demographics;
select an interactive media campaign in accordance with the one or more demographics, the interactive media campaign including a plurality of multimedia content items and a plurality of questions, wherein the interactive media campaign is associated with a subset of the one or more demographics;
select, from the interactive media campaign, a multimedia content item from the plurality of multimedia content items and a question from the plurality of questions, wherein the question is associated with a plurality of predefined answers to the question;
transmit, to the client device:
instructions that cause the multimedia content item to be presented by the client device;
instructions that cause the question to be presented by the client device concurrently with the multimedia content item; and
instructions that cause a plurality of respective affordances to be presented on the client device, each respective affordance of the plurality of respective affordances corresponding to a respective answer of the predefined answers to the question;
at the client device:
receive, from the server system, and process:
the instructions that cause the multimedia content item to be presented;
the instructions that cause the question to be presented by the client device concurrently with the multimedia content item; and
the instructions that cause the plurality of affordances to be presented on the client device;
initiate concurrent display of the multimedia content item including the question;
upon a lapse of a first predetermined amount of time following initiating display of the multimedia content item, display the plurality of respective affordances on the display, wherein selection of one of the plurality of respective affordances corresponds to selection of a predefined answer to the question and causes the electronic device to discontinue display of the multimedia content item and transmit a response corresponding to the selected predefined answer to the server system;

upon a lapse of a second predetermined amount of time following initiating display of the multimedia content item, display a multimedia-skip affordance, wherein:

the second predetermined amount of time is longer than the first predetermined amount of time; and selection of the multimedia-skip affordance causes the client device to discontinue display of the multimedia content item without receiving selection of a respective user response to the question;

detect a user input that selects one of the multimedia-skip affordance or a respective affordance of the plurality of affordances; and upon detection of the user input, discontinue display of the multimedia content item;

at the server system:

after selection of one of the plurality of respective affordances, receive, from the client device, the response corresponding to one of the predefined answers to the question; and update, based on the response to the question, the user profile corresponding to the client device.

* * * * *

UNITED STATES PATENT AND TRADEMARK OFFICE
CERTIFICATE OF CORRECTION

PATENT NO.         : 10,475,066 B1
APPLICATION NO.    : 14/752715
DATED              : November 12, 2019
INVENTOR(S)        : Kakani et al.

Page 1 of 1

It is certified that error appears in the above-identified patent and that said Letters Patent is hereby corrected as shown below:

In the Claims

Claim 1, Column 30, Lines 51-52, please delete "answer the" and insert --answer of the--.

Signed and Sealed this
Eleventh Day of February, 2020

Andrei Iancu
*Director of the United States Patent and Trademark Office*